(12) United States Patent
Ishikawa et al.

(10) Patent No.: US 7,739,029 B2
(45) Date of Patent: Jun. 15, 2010

(54) NAVIGATION APPARATUS AND METHOD WITH TRAFFIC RANKING AND DISPLAY

(75) Inventors: Hiroki Ishikawa, Okazaki (JP); Tomoyuki Zaitsu, Okazaki (JP); Masao Kawai, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 283 days.

(21) Appl. No.: 11/217,454

(22) Filed: Sep. 2, 2005

(65) Prior Publication Data

US 2006/0064235 A1 Mar. 23, 2006

(30) Foreign Application Priority Data

Sep. 8, 2004 (JP) ............................. 2004-261613
Sep. 8, 2004 (JP) ............................. 2004-261614

(51) Int. Cl.
*G01C 21/26* (2006.01)
(52) U.S. Cl. ........................ 701/117; 701/118; 701/119; 340/995.13; 340/995.27
(58) Field of Classification Search ................. 701/117, 701/118, 119, 208, 209, 210; 340/995.13, 340/995.19, 995.27
See application file for complete search history.

(56) References Cited

U.S. PATENT DOCUMENTS 5,878,368 A * 3/1999 DeGraaf ...................... 701/209

| | | | |
|---|---|---|---|
| 2002/0177946 A1 | 11/2002 | Ueno | |
| 2003/0033078 A1* | 2/2003 | Kita et al. | 701/117 |
| 2004/0225437 A1* | 11/2004 | Endo et al. | 701/209 |
| 2004/0249568 A1* | 12/2004 | Endo et al. | 701/209 |
| 2005/0027447 A1* | 2/2005 | Hirose et al. | 701/210 |
| 2005/0043880 A1* | 2/2005 | Yamane et al. | 701/200 |

FOREIGN PATENT DOCUMENTS

| EP | 1 548 407 A | | 6/2005 |
|---|---|---|---|
| JP | A-4-1784894 | | 6/1992 |
| JP | A 9-113290 | | 5/1997 |
| JP | A 10-019593 | | 1/1998 |
| JP | 2002318128 A | * | 10/2002 |
| JP | 2003214877 A | * | 7/2003 |
| JP | 2004233230 A | * | 8/2004 |
| JP | 2004239741 A | * | 8/2004 |

* cited by examiner

*Primary Examiner*—Khoi Tran
*Assistant Examiner*—Spencer Patton
(74) *Attorney, Agent, or Firm*—Oliff & Berridge, PLC

(57) ABSTRACT

A navigation apparatus and method store traffic information and searches for a guidance route to a specified destination. The apparatus and method calculate congestion degrees for the guidance route based on a factor by time period and the stored traffic information and display the guidance route and the congestion degrees by time period.

17 Claims, 19 Drawing Sheets

LINK INFORMATION

| LINK NUMBER | NODE NUMBER | ROAD TYPE | LINK LENGTH | WIDTH |
|---|---|---|---|---|
| 1 | 21-27 | NATIONAL ROAD | 100 | 8 |
| 2 | 101-38 | TOLLWAY | 3000 | 12 |
| 3 | | | | |
| ⋮ | | | | |
| nnn | | | | |

TRAFFIC INFORMATION DATABASE

| DATE | TIME | LINK NUMBER | CONGESTION DEGREE | TRAVEL TIME (sec) |
|---|---|---|---|---|
| Jan 1 | 00 : 00 | 1<br>2<br>⋮<br>nnn | 1<br>4<br>⋮<br>2 | 20<br>135<br>⋮<br>42 |
| | 00 : 15 | | | |
| | ⋮ | | | |
| | 23 : 45 | | | |
| Jan 2 | 00 : 00 | | | |
| | ⋮ | | | |
| | 23 : 45 | | | |
| ⋮ | ⋮ | | | |
| Dec 31 | 00 : 00 | | | |
| | ⋮ | | | |
| | 23 : 45 | | | |

FIG. 6
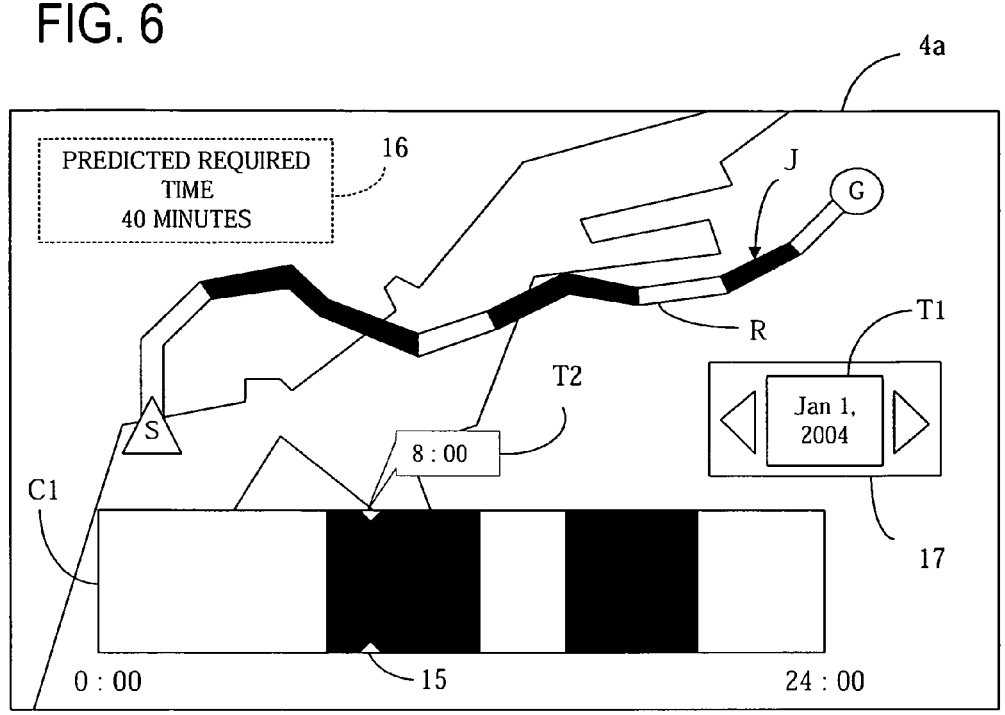
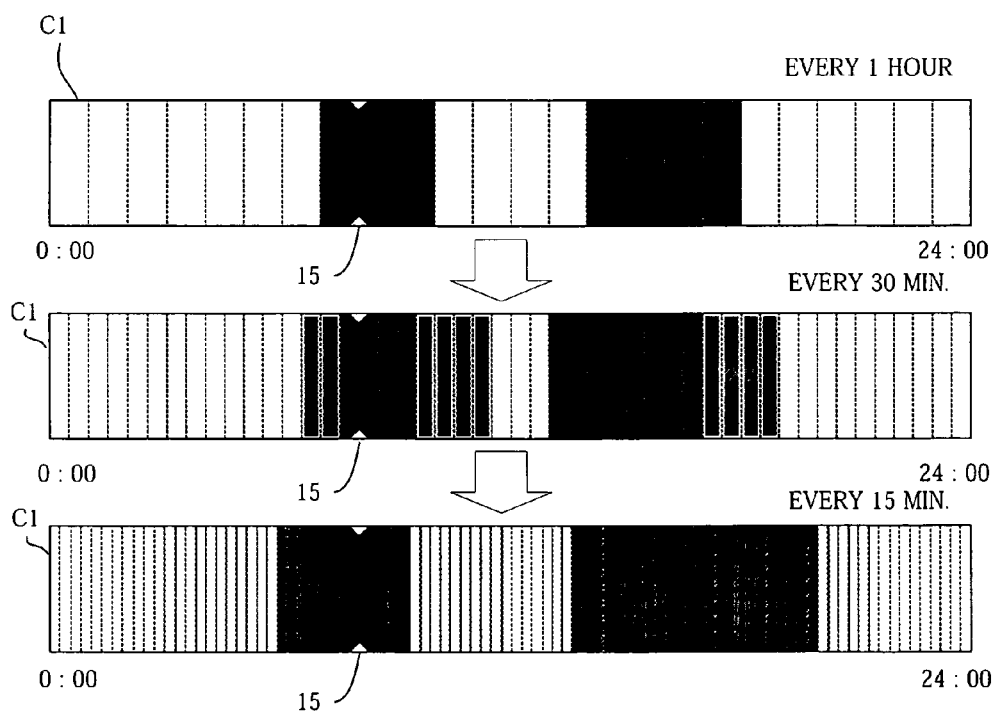

NAVIGATION APPARATUS AND METHOD WITH TRAFFIC RANKING AND DISPLAY

INCORPORATION BY REFERENCE

The disclosures of Japanese Patent Applications Nos. 2004-261613 filed on Sep. 8, 2004 and 2004-261614 filed on Sep. 8, 2004 including the specifications, drawings and abstracts are incorporated herein by reference in their entirety.

BACKGROUND

1. Related Technical Fields

Related technical fields include navigation apparatus.

2. Description of Related Art

Conventional navigation apparatus, such as, for example, described in Japanese Unexamined Patent Application Publication No. H9-113290, display a map to a destination. The conventional navigation apparatus display information such as, for example, route information, and guide a user to a destination. The navigation apparatus use past traffic information statistics to predicted traffic conditions, such as a current or future road congestion condition.

In conventional navigation apparatus, the traffic information from outside of the vehicle is received and stored in a storage unit. When searching a guidance route, the latest traffic information and the accumulated past traffic information in the storage unit are used to search for a predicted guidance route which may be the best route to arrive at the destination in the shortest possible time.

Conventional navigation apparatus, such as, for example, described in Japanese Unexamined Patent Application Publication No. H10-019593 abstracts link travel times from traffic information received in the form of a radio beacon or optical beacon via a radio beacon device or in the form of an FM multiple broadcasting via an FM multiple receiver unit. Then the abstracted link travel times are stored in a memory. The memory stores, for example, average link travel times every 10 minutes in the last four weeks. The navigation apparatus calculates a required time to arrive at a destination based on the latest traffic information received from the radio beacon device or the FM multiple receiver. For example, if the required time is equal to or less than 1 hour, the latest traffic information may be used for a guidance route search. If the required time is longer than 1 hour, the past traffic information (link travel time information) stored in the memory may be used for searching a guidance route for excess. If the latest traffic information is not received depending on place, only the past traffic information (link travel time information) stored in the memory is used for searching the guidance route.

SUMMARY

The aforementioned conventional navigation apparatus stores the statistically processed road map data and the past congestion information along roads for each day and time period. When the user specifies a day and a time period, congestion information related to the day and the time period is read out. The navigation apparatus displays a congestion mark for such congestion information above the road map.

Specifically, after the user selects a day of the week on a predetermined day selecting screen and selects a time period on a time period selecting screen, a road map display screen is displayed. The navigation apparatus displays congestion marks overlapped with the road map in the display screen. Note that, the aforementioned conventional navigation apparatus displays congestion degrees by changing a thickness between congestion marks and changing colors of the congestion marks. The conventional navigation apparatus obtains the day and time information, and automatically specifies the day and time period. Thus, the user may predict coming congestion and select a route to avoid the congestion.

However, in the conventional navigation apparatus described above, congestion information for only a specified day and a time period is displayed on the road map. Further the display screen is switched between the display screen to specify a day and a time and the congestion information display screen. Thus, it is not easy to compare congestion information for non-specified days and times with each other. Thus, for example, even if the user wants to change a departure time or a departure date on the same route, it is not easy to determine a suitable departure time or a departure date to avoid congestion, by comparing the congestion at various times.

Accordingly, it is beneficial to provide a navigation apparatus that may easily compare congestion degrees at different times for each point on a guidance route so that the user may determine a preferable departure date and/or time easily.

Furthermore in the conventional navigation apparatus described above, if the required time to arrive at the destination is equal to or less than 1 hour, the latest traffic information may be used for searching the guidance route. This is because congestion degrees might not change significantly within about one hour from a current time. During such short time period, the latest traffic information may be better than the past traffic information to search for the guidance route.

However, whenever the required time to the destination is equal to or less than 1 hour, the conventional navigation apparatus searches a guidance route on condition that a current time is a departure time as is clear from using the latest traffic information for the guidance route search. Therefore, the conventional navigation apparatus does not search for the guidance route when changing the departure time. The navigation apparatus does not calculate a predicted required time to the destination. Thus, the user may not easily know when is the best departure time because the user needs to change the starting time. Even if a guidance route to arrive at the destination earlier is found once changing the starting time or if a simple guidance route to arrive at the destination in the almost same time is found once changing the starting time, the user can not easily search for such guidance route.

Thus, It is beneficial to provide a navigation apparatus that may easily change a specification of a time factor such as time and/or date. Further the navigation apparatus may determine and display a recommended guidance route based on traffic information in consideration of the time factor every time the factor is changed. Accordingly, the user may easily compare the difference between times of changing factors on the recommended guidance and decide one guidance route, changing the starting time or the starting date.

Accordingly, various exemplary implementations of the principles described herein provide a navigation apparatus, including a memory that stores traffic information and a controller. The controller searches for a guidance route to a specified destination; calculates congestion degrees for the guidance route based on a factor by time period and the stored traffic information; and displays the guidance route and the congestion degrees by time period.

Accordingly, various exemplary implementations of the principles described herein provide a navigation method. The method including storing traffic information; searching for a guidance route to a specified destination; calculating congestion degrees for the guidance route based on a factor by time period and the stored traffic information; and displaying the guidance route and the congestion degrees by time period.

BRIEF DESCRIPTION OF THE DRAWINGS

Exemplary implementations will now be described with reference to the accompanying drawings, wherein:

FIG. 6 shows a display screen to display congestion degrees by more detailed time periods according to an exemplary implementation of the principles described herein;

DETAILED DESCRIPTION OF EXEMPLARY IMPLEMENTATIONS

Figure 1:
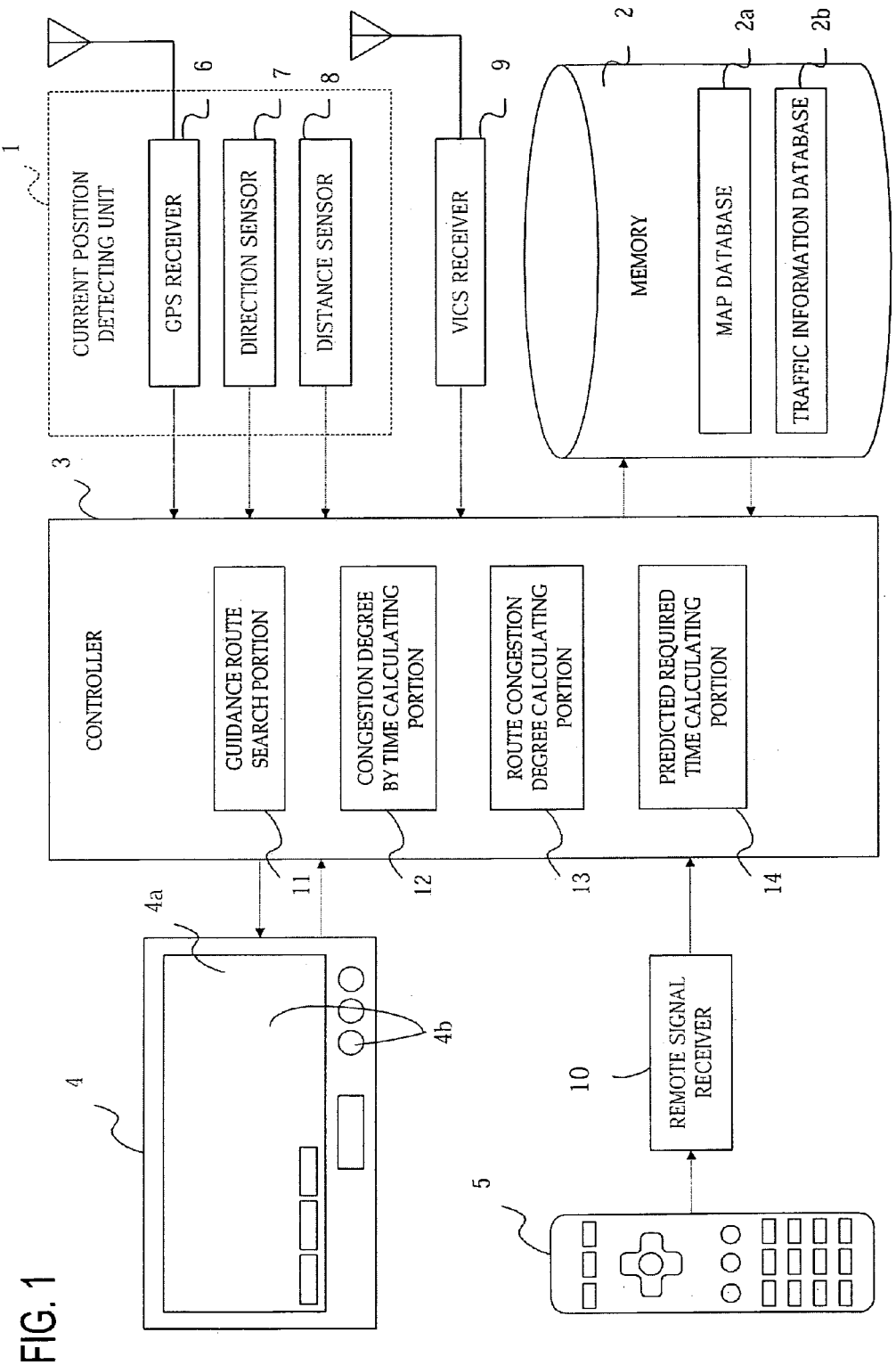
FIG. 1 is a block diagram showing an exemplary navigation apparatus according to an exemplary implementation of the principles described herein.

As a first example, a navigation apparatus may include a car navigation system installed on a vehicle. FIG. 1 shows an example of such a navigation apparatus. As shown in FIG. 1, the navigation apparatus may include, for example, a current position detector 1, a memory 2, a controller 3, a display input unit 4, a remote control input unit 5, and a VICS receiver 9.

The current position detector 1 may include, for example, a GPS (Global Positioning System) receiver 6, a direction sensor 7, and/or a distance sensor 8. The GPS receiver 6 may receive signals from an artificial satellite. The GPS receiver 6 may receive various kinds of information such as, for example, a transmitting time of a signal, position information of the GPS receiver 6, a travel speed of the GPS receiver 6, and a travel direction of the GPS receiver. As the direction sensor 7, for example, a gyroscopic sensor, a geomagnetic field sensor, an optical rotation sensor, a rotational resistance volume attached to a rotating part of a handle, or an angle sensor disposed on a wheel may be used. The direction sensor 7 may detect a vehicle travel direction. The distance sensor 8 may detecting a vehicle travel distance and may include, for example, a sensor for detecting a number of wheel rotations, a sensor for detecting acceleration, and/or a circuit or program for integrating the detected acceleration twice.

The VICS (Vehicle Information and Communication System®) receiver 9 may receive signals from signal transmitters, for example, disposed on predetermined points along roads. The VICS receiver 9 may receive an optical beacon and/or a radio beacon from VICS, and/or VICS signals in the form of FM multiple broadcasting via an FM radio station. The controller 3 may obtain various kinds of information such as congestion information, current position information, and/or parking area information from signals received from the VICS receiver 9.

The memory 2 may include a storage medium for storing information and a controller for using the information such as, for example, a hard disk drive, a DVD drive with a DVD-ROM, and/or a CD drive with a CD-ROM. The memory 2 may store, for example, a map database 2a and a traffic information database 2b.

Figure 2:
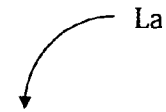
FIG. 2 shows link information for each link in a map database according to an exemplary implementation of the principles described herein.

The map database 2a may store map information, for example, to be displayed on a display portion 4a (as described later) of the display input unit 4. The map information may include, for example, a road layer, a background layer for, for example, facility information, and/or a character layer for displaying characters indicating, for example, area names such as city, town, and/or village names. The road layer may include, for example, a plurality of nodes N indicating position information on a map by latitude and longitude and a plurality of links L, each connecting two nodes N. Each link L may have link information La. As shown in FIG. 2, road attitude information such as, for example, a link number, node numbers for both end nodes N, a road type (such as, for example, expressway, tollway, national road, and/or prefectural road) a link length, and/or road width, may be included in the link information La.

As used herein, the term "link" refers to, for example, a road or portion of a road. For example, according to one type of road data, each road may consist of a plurality of componential units called links. Each link may be separated and defined by, for example, an intersection, an intersection having more than three roads, a curve, and/or a point at which the road type changes. As used herein, the term "node" is used to describe a point in the map data, where one or more links connect such as, for example, an intersection, an intersection having more than three roads, a curve, and/or a point at which the road type changes.

Figure 3:
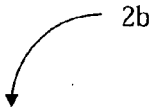
FIG. 3 shows a traffic information database according to an exemplary implementation of the principles described herein.

The traffic information database 2b may store, for example, congestion degree information and/or travel time information corresponding to all links L (link number 1 to nnn) in the map database 2a for every date (January $1^{st}$ to December $31^{st}$ in this example) and/or for every time (every fifteen minute from 00:00 to 23:45 in this example) as shown in FIG. 3. Traffic congestion degrees may be rated, for example, on a scale of five levels in order of traffic congestion degree, such as 1 for "non-congested," 2 for "sort of crowded," 3 for "crowded," 4 for "sort of congested," and 5 for "congested." It should be appreciated that the congestion degrees may be rated on a scale of more than five levels or less than five levels. As used in this example, "travel time" is a time needed to travel from one node N on a link to the other node N on the other end of that link L. In FIG. 3, travel times are indicated in seconds. Note that, the information stored in the traffic information database 2b may be obtained, for example, by statistically processing past travel times and past congestion degrees for links L at an identical time on an identical day or date based on information, such as, past VICS information, road traffic census information, and/or travel history information by a traveling vehicle or another vehicle.

Figure 5:
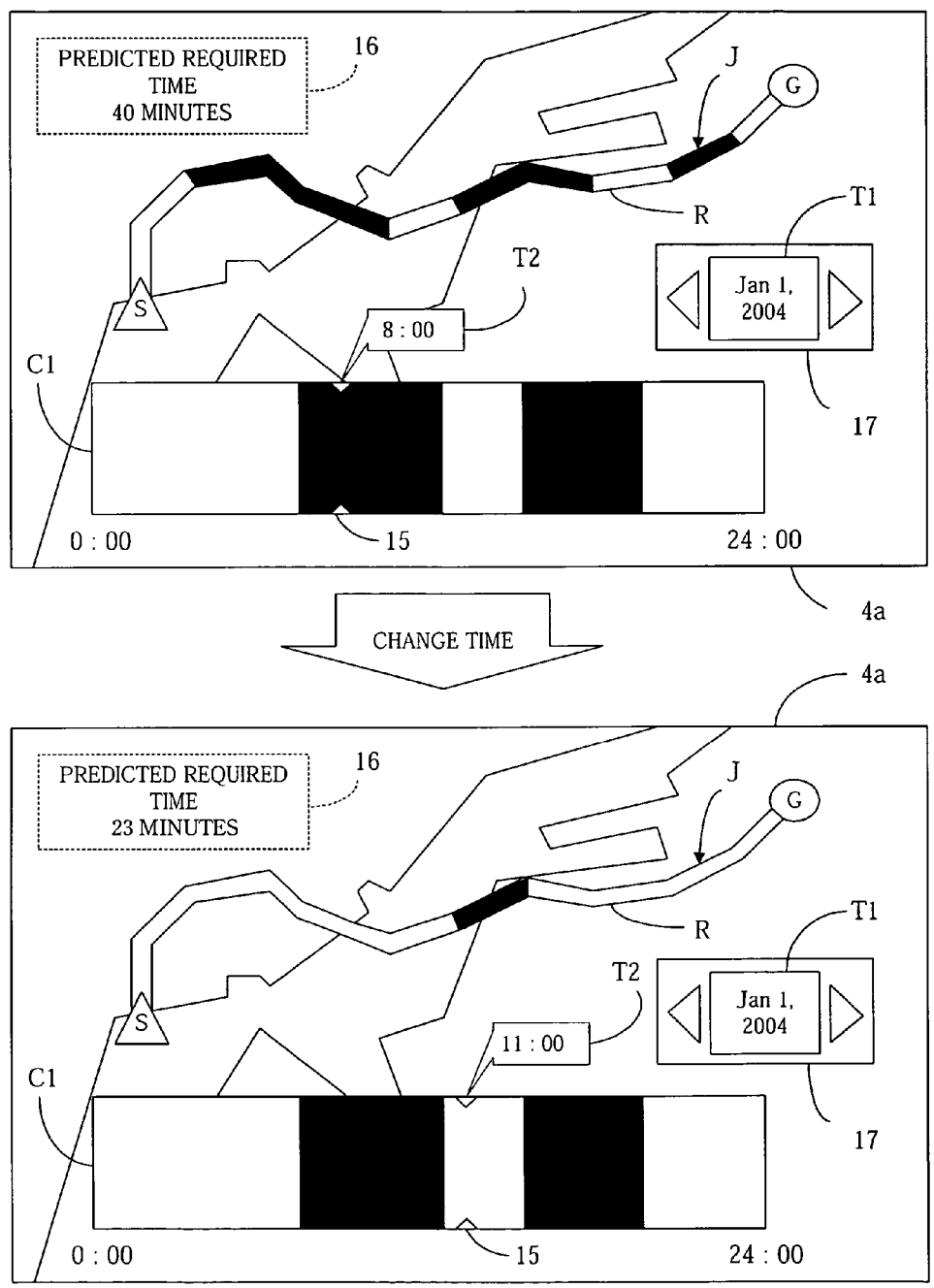
FIG. 5 shows a display screen of a navigation apparatus according to an exemplary implementation of the principles described herein.

As shown in FIG. 1, the display input unit 4 may include the display portion 4a, for example, for displaying a map and various information for route guidance, such as, for example, a guidance route R (as described in FIG. 5). The display input unit 4 may further include an input portion 4b, for example, for receiving an input by a user, such as, for example, the driver of the vehicle who is provided route guidance. A liquid crystal display, a plasma display, and/or a CRT (cathode-ray tube) display may be used as the display portion 4a. The input portion 4b may include, for example, a touch panel disposed on a display screen of the display portion 4a and/or various kinds of switches disposed around the display screen. The remote control input unit 5 may be, for example, a device for transmitting data input by the driver of the vehicle to the controller 3. The transferred information may be input in the controller 3 via a remote control receiver 10.

The controller 3 may execute, for example, various calculations and/or control processes. For example, the controller 3 may execute display processing for a map and various information for, for example, a guidance route R, search processing for a destination G and the guidance route R to the destination G (as described in FIG. 5), guidance processing for guiding the route to the destination G and/or traffic information along the road. For example, the controller 3 may include a CPU for controlling various calculations and processes to control various parts of the navigation apparatus, a RAM for functioning as a working memory, and/or a ROM for storing instructions and/or software such as various kinds of operation programs and/or control programs. The current position detector 1, the memory 2, the display input unit 4, and the remote control input unit 5 may be connected to the controller 3.

As shown in FIG. 1, the controller 3 may functionally, conceptually, and/or physically include, a guidance route search portion 11, a congestion degree by time calculating portion 12, a route congestion degree calculating portion 13, and a predicted required time calculating portion 14.

The guidance route search portion 11 may search and determine a guidance route R from a starting point S to a destination G when the user specifies the destination G. The starting point S may depend on the current position of the vehicle detected by the current position detector 1 or the starting point S may be specified by an input of the input portion 4b of the display input unit 4 and/or the remote control input unit 5, for example, by the user. The guidance route search portion 11 may execute the search and route determination by many methods. An exemplary method is described below.

Figure 4:
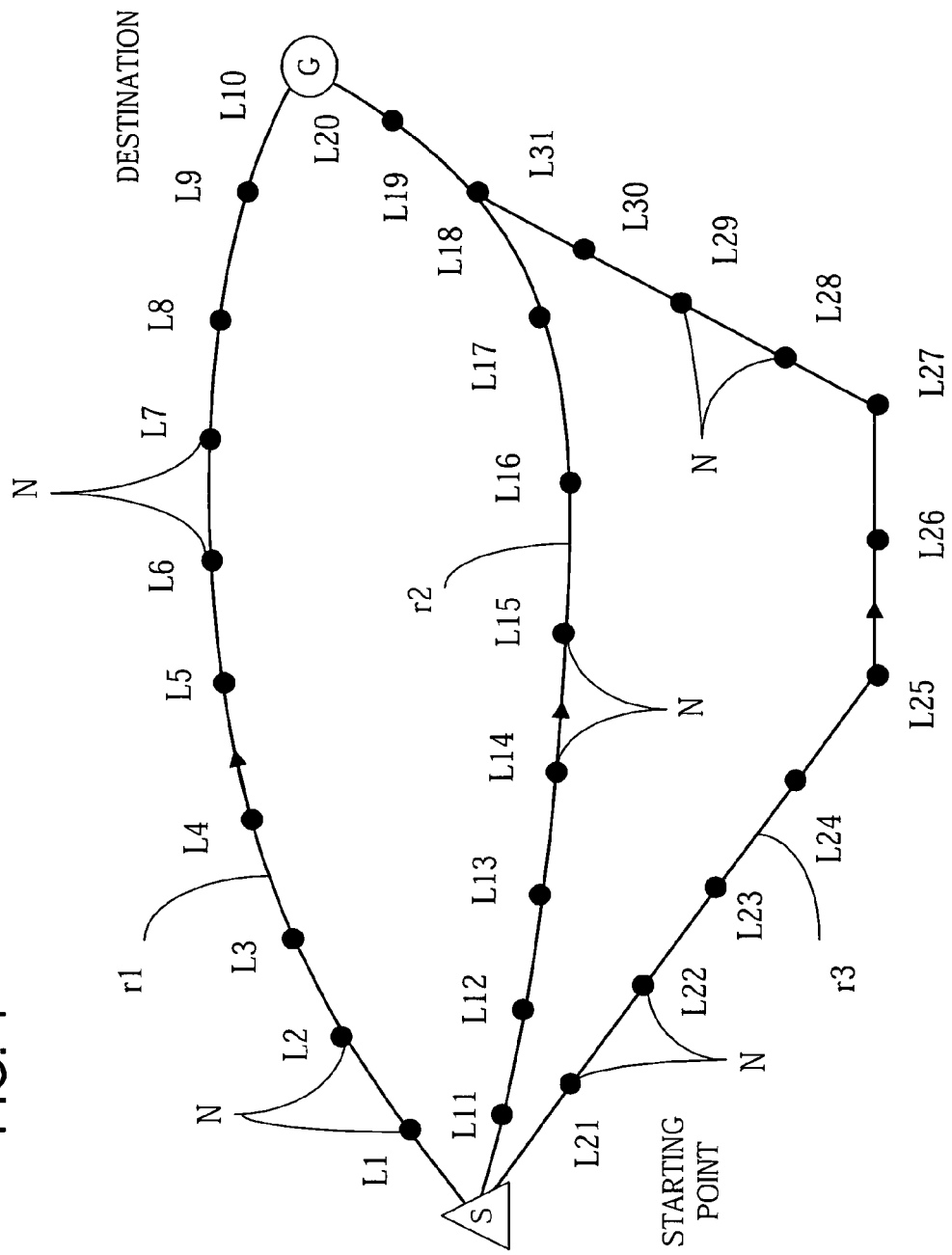
FIG. 4 shows a relationship between a link and nodes used for a guidance route search according to an exemplary implementation of the principles described herein.

This exemplary method is based on travel times of each link L on the guidance route R. For example, as shown in FIG. 4, when the starting point S and the destination G are specified, a plurality of potential routes r1, r2, and r3 connecting the two points may be found. Each of the potential routes r1, r2, and r3 is recognized as a series of links (L1, L2, .... Lnnn). AS discussed above, the traffic information database 2b may store the travel time information for each link L by day and time.

According to the traffic information database 2b shown in FIG. 3, the congestion degrees (level 1 to 5) and the travel times (for example, 20 seconds, 135 seconds, or 42 seconds etc.) are determined for all links L1, L2, ... Lnnn identified by link numbers at a specified time (for example, 00:00) on a specified date (for example, January 1). Therefore, it is possible to calculate predicted required times needed to travel each of the potential routes R1, R2, and R3. The required time may be considered a "cost" needed to travel the route. Accordingly, a potential route r1, r2, and r3 with the lowest cost may be determined as a recommended guidance route R.

In the above example, travel time represents a route's cost. However, other factors in link information La for each link L, for example, road type, road width, required time to pass through an intersection when a node N connecting links L is an intersection, distance from the starting point to a link L or to a node N, the number of right/left turns, and/or the number of lanes may be used for calculating a route's cost.

The congestion degree by time calculating portion 12 may calculate congestion degrees by different time factors for the guidance route R searched by the guidance route search portion 11 based on, for example, the traffic information database 2b. As the time factors, for example, time, date, and/or day of the week may be used. According to this example, time is used as the time factor. FIG. 5 shows an exemplary display screen that shows, the guidance route R, for example, searched by the guidance route search portion 11. The exemplary display screen shows a congestion degree C1 (hereinafter referred to as "congestion degree by time") at different times for the entire guidance route R, for example, calculated by the congestion degree by time calculating portion 12. The exemplary display screen shows a congestion degree J (hereinafter referred to as "route congestion degree") at various points on the guidance route R at a specified time T2 on a specified date T1, for example, calculated by the route congestion degree calculating portion 13. In the top display of FIG. 5, the specified time T2 is 8:00. In the bottom display of FIG. 5, the specified time T2 is 11:00.

As shown in FIG. 5, the congestion degree by time calculating portion 12 may calculate the congestion degree C1 (congestion degree by time) of the guidance route R at each time along a predetermined time axis, for example, based on the traffic information database 2b. The congestion degree by time calculating portion 12 may read out congestion degrees and/or travel times of all links L constituting the guidance route R at all times (00:00 to 23:45 in this case) on a specified date T1 which is specified by the user. Based on the read out information, the congestion degree C1 of the entire guidance route R may be calculated according to each time along the time axis indicating one day from 00:00 to 24:00 (every 15 minutes from 00:00 to 23:45 in this case). A current date may be set as a default specified date T1 when the user does not specify the date T1. Two exemplary methods of calculating congestion degrees of the entire guidance route R at each time, that is, the congestion degree by time C1, will be described below.

According to the first exemplary method, link lengths of all links L composing the guidance route R may be read out from the link information La of each link L stored in the map database 2a. The total distance of the guidance route R, for example, calculated as the total of the lengths of all links on the guidance route R is read out from the traffic information database 2b with travel times of all links L composing the guidance route R according to a time on the specified date T1. Based on the total travel time of the guidance route R calculated from the accumulated travel times, an average vehicle speed for the guidance route R may be obtained. An exemplary equation for determining the average speed may be: (Average speed)=(Total distance of guidance route R)/(Total travel time of guidance route R).

The congestion degree by time calculating portion 12 of the controller 3 may set levels (e.g., level 1 to 5) of the average speeds for the guidance route R. The level 1 may represent the fastest average speed. The controller 3 may includes an average speed-congestion degree table in which various average speed levels are assigned corresponding congestion degrees. Thus, based on the table, the average speed may be converted to a congestion degree.

According to a second exemplary method, the total distance of the guidance route R is calculated. Then a total length of only the links L composing the guidance route R at a time on the specified date T1 in the traffic information database 2b that have a congestion level equal to or greater than a predetermined level (for example, the congestion degrees are equal to or greater than 3 in this case), are read out from the link information La. The read out link lengths are added to obtain an accumulated congestion distance. Next, a congestion distance ratio of the guidance route R is calculated, for example, according to the equation: (Congestion distance ratio)=(Cumulative congestion distance)/(Total distance of guidance route R).

The congestion degree by time calculating portion 12 of the controller 3 may then set five levels (level 1 to 5) of the congestion distance ratio for the guidance route R. The level 1 may be for the lowest degree. The controller 3 may includes a congestion distance ratio-congestion degree table in which the congestion distance ratio is used to determine the congestion degree. Thus, based on the table, the congestion distance ratio of the guidance route may be used to determine the congestion degree on the guidance route R.

The congestion degrees for the entire guidance route R at a time on the specified date T1 may be determined, for example, by the above first or second exemplary methods of determining congestion degree. Accordingly, the congestion degree may be determined for all times on the specified date T1 (every 15 minutes from 00:00 to 23:45 in this case). As a result, the congestion degree C1 (congestion degree by time) for the entire guidance route R at each time along the time axis for the whole day of the specified date T1 may be calculated. The calculated congestion degree by time C1 may displayed with various colors and/or various patterns corresponding to the congestion degrees on the display portion 4a of the display input unit 4, as shown in FIG. 5. For example, the congestion degree by time C1 may be displayed along the horizontal time axis from 00:00 to 24:00. Note that, any display colors and/or display patterns may be used for the congestion degrees. For example, higher congestion degrees may be indicated by red end colors and lower congestion degrees may be indicated by blue end colors.

The congestion degree by time calculating portion 12 may calculate the congestion degree by time C1 by more detailed time period interval. Every time the calculation of congestion degrees by one time period is terminated, the display may be updated to show the new congestion degree by time C1. FIG. 6 shows an exemplary display screen in which the congestion degree by time C1 is displayed by more detailed time period interval. The top display screen in FIG. 6 shows the full display screen. Below the display screen in FIG. 6, the change of the congestion degree by time C1 is shown at increasingly smaller time intervals. As shown in FIG. 6, the congestion degree by time calculating portion 12 calculates the congestion degree by time C1, changing an interval step-by-step such as every 1 hour, every 30 minutes, or every 15 minutes. The congestion degree by time C1 is calculated every 1 hour from 00:00 to 23:00 first. When the calculation is terminated, the calculated congestion degree by time C1 is displayed on the display portion 4a.

Next, the congestion degree by time C1 is calculated every 30 minutes from 00:00 to 23:30 (excepting overlapping times between 1 hour and 30 minutes). When the calculation is terminated, the display on the display portion 4a for the calculated congestion degree by time C1 is updated. Then the congestion degree by time C1 is calculated every 15 minutes (excepting overlapping times with 1 hour and 30 minutes and 15 minutes). When the calculation is terminated, the display on the display portion 4a is updated again. According to this example, when the calculation of the congestion degree by time C1 is executed every 5 minutes, the calculation needs to be executed 288 times. However, if the congestion degree by time C1 is calculated every 1 hour, first, it may be displayed to the user while the congestion degree by time C1 for the remaining smaller time intervals is calculated. Accordingly, information may be presented more quickly to the user.

The congestion degree by time C1 at may continue to be displayed at decreasing intervals. The time resolution does not have to be set evenly all over the time axis 00:00 to 24:00. For example, the congestion degree by time C1 at a small time resolution may be calculated within a predetermined time period around a specified time such as, for example, a current time first. According to the remaining time period, the congestion degree by time C1 may be calculated at a detailed time resolution step by step.

As shown in FIG. 5, the route congestion degree calculating portion 13 may calculate congestion degrees at various points on the guidance route R searched by the guidance route search portion 11 (the route congestion degree J) at the specified time T2 which is specified by the user based on the traffic information database 2b. Specifically, the route congestion degree calculating portion 13 may, for example, read out congestion degrees of all links L composing the guidance route R at the same specified time T2 on the same specified date T1 as the time when the congestion degree by time calculating portion 12 calculated the congestion degree by time C1 from the traffic information database 2*b*. Then the congestion degrees of links L composing the guidance route R may be set as the route congestion degree J for various positions on the guidance route R.

The calculated route congestion degree J is displayed with various colors and/or various patterns corresponding to the congestion degrees of the links L and are overlapped each position of the links L on the guidance route R on the display portion 4*a* of the display input unit 4 as shown in FIG. 5. Note that, the display colors and the display patterns for the congestion degrees are not limited to particular ways, but it is preferable that the same display method is used for this time and for the congestion degree by time C1 calculated by the congestion degree by time calculating portion 12.

Both of the congestion degree by time C1, which is calculated by the congestion degree by time calculating portion 12, and the route congestion degree J at the specified time T2, which is calculated by the route congestion degree calculating portion 13, are estimated values because such congestion degrees are calculated based on the traffic information database 2*b* which stores statistically-processed past information such as, for example, past VICS information and past road traffic census information.

The predicted required time calculating portion 14 calculates a predicted required time 16 to arrive at the destination G in case that the specified time T2 on the specified date T1 is set as the starting time based on the traffic information database 2*b* according to the guidance route R searched by the guidance route search portion 11. More specifically, the predicted required time calculating portion 14 reads out each travel time at the specified time T2 on the specified date T1 for all links L on the guidance route R from the traffic information database 2*b*. The total travel time for the guidance route R, which is calculated by adding all the travel times, is set as the predicted required time 16. The calculated predicted required time 16 is displayed on the display portion 4*a* of the display input unit 4 as shown in FIG. 5.

The designation of the specified time T2 may be accepted by the input portion 4*b* of the display input unit 4 or the remote control input unit 5. One method of the acceptance is described in FIG. 5. The designation of a time corresponding to a position, which is specified on the congestion degree by time C1 on the display portion 4*a*, is accepted by the input portion 4*b* of the display input unit 4. When the user touches the congestion degree by time C1 along the time axis from 00:00 to 24:00 displayed on the display portion 4*a* by using the input portion 4*b*, the time on the time axis corresponding to the touched position is accepted as the specified time T2. The specified time T2 is overlapped with the congestion degree by time C1 as a cursor display 15. A current time may be set as a default specified time T2 when the user does not specify T2. Note that, for example, even if the cursor display 15 on the congestion degree by time C1 is moved by operation of the remote control input unit 5, the input of the specified time T2 may be accepted.

The designation of the specified date T1 may be accepted by the input portion 4*b* of the display input unit 4 or the remote control input unit 5. One method of the acceptance is described in FIG. 5. A date specification display 17 is displayed on the display unit 4*a* of the display input unit 4. Based on a specification of a point on the date specification display 17 by the input portion 4*b* of the display input unit 4, the date designation is accepted. In the date specification display 17, the specified date T1 is displayed at the center of the area and triangle icons are displayed at the both sides of the specified date T1 to switch the specified date. When the user touches either of the triangle icons by the input portion 4*b* as a touch panel, the day before the current specified date T1 or the day after the current specified date T1 is selected. Then the changed specified date T1 is displayed at the center of the display area. A current date may be set as a default specified date T1 when the user does not specify T1. Note that, for example, the input of the specified date T1 may be accepted even by operation of the remote control input unit 5.

Next, an exemplary guidance method using the congestion degrees, for example, on the guidance route R will be described with flowcharts in FIGS. 7 and 8. According to this method, the congestion degrees (the congestion degree by time C1) are calculated for the entire guidance route R at every time along the time axis within one day from 00:00 to 24:00 according to the specified date T1. The guidance route R, the route congestion degrees J, and the predicted required time 16 are displayed. Note that the exemplary method shown in FIGS. 7 and 8 may be executed, and is described below, for example, under the control of the controller 3. However, it should be appreciated that the method need not be limited by any of the above-described structure.

As shown in the flowcharts, when the user specifies the destination G (Step #01=YES), the controller 3 searches for routes to the destination G specified by the guidance route search portion 11 and determines one of the routes as the guidance route R (Step #02).

If the specified date T1 is not specified (Step #03=NO), the current date is set as the specified date T1 (Step #04). If the T1 has been specified (Step #03=YES), the specified date is set as the T1 (Step #05). According to this example, the congestion degrees on the guidance route R start being displayed, even if the user has not specified the specified date T1 yet. Therefore, the congestion degrees in case that the current date is the specified date T1 are displayed first. As with the T1, when the specified time T2 is not specified (Step #06=NO), the current time is set as the specified time T2 (Step #07). If the T2 has been specified (Step #06=YES), the specified time is set as the T2 (Step #08). According to this example, the congestion degrees on the guidance route R start being displayed, even if the user has not specified the specified time T2 yet. Therefore, the congestion degrees in case that the current time is the specified time T2 are displayed first. Note that, the current date and time information may be obtained from signals received by the GPS receiver or the VICS receiver 9, and/or for example, a clock with a calendar function (not shown) included in the navigation apparatus.

Then the controller 3 reads out the traffic information for all times in all day of the specified date T1 according to all links L composing the guidance route R searched in Step #02 from the traffic information database 2*b* stored in the memory 2. The congestion degrees and the travel times are read out and obtained as the traffic information (Step #09). The congestion degree by time calculating portion 12 calculates the congestion degree by time C1 for the guidance route R according to the specified date T1 based on the traffic information obtained in Step #04 as described above (Step #10). The route congestion degree calculating portion 13 calculates the route congestion degree J of the guidance route R at the specified time T2 on the specified date T1 based on the traffic information obtained in Step #04 as described above (Step #11). Further, the predicted required time calculating portion 14 calculates the predicted required time 16 which is needed to travel the guidance route R to the destination G, in case that the specified time T2 on the specified date T1 is the starting time, based on the traffic information obtained in Step #04 (Step #12). As shown in FIG. 5, the guidance route R, the congestion degree by time C1, the route congestion degree J, and the predicted required time 16 may be displayed on the display portion 4*a* of the display input unit 4 (Step #13). Note that, the top screen in FIG. 5 shows a default display screen when the user has not specified the specified date T1 and the specified time T2 yet. Therefore, the current date is set as the default date T1 (Jan. 1, 2004 in this case) and the current time is set as the default time T2 (8:00 in this case).

When route guidance starts (Step #14=YES), the display of the congestion degrees for the guidance route R is terminated and only the route guidance is executed. Meanwhile, if the route guidance is not started (Step #14=NO), the operation returns to Step #03. When the user specifies the specified date T1 (Step #-3=YES) or when the user specifies the specified time T2 (Step #06=YES), the operation of Step #09 through Step #13 is again executed based on the specified date T1 and the specified time T2. For example, as shown in the lower screen of FIG. 5, the changed congestion degree by time C1 (only when the specified date T1 is changed), the changed route congestion degree J, and the changed predicted required time 16 based on the new specified date T1 and the new specified time T2 may be displayed on the display portion 4*a* of the display input unit 4 (Step #13).

Figure 9:
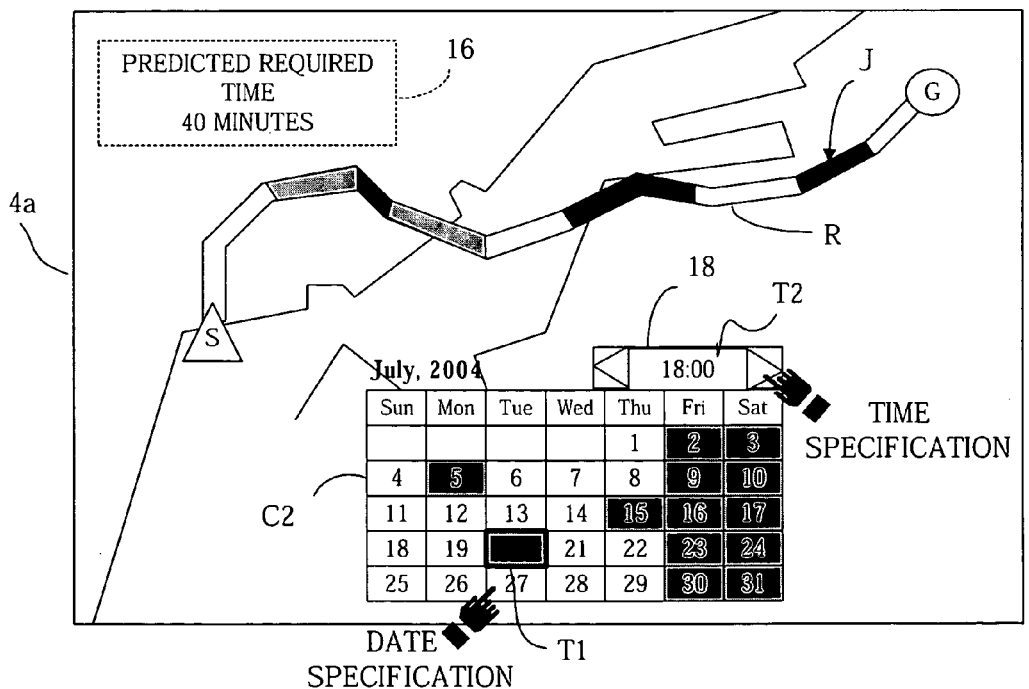
FIG. 9 shows a display screen of a navigation apparatus according to an exemplary implementation of the principles described herein.

Next, another example will be described. As described in the example above, "time" is set as a unit of time period for the time factor. However, according to this example, "date" is set as a unit of time period for the factor. The congestion degree by time calculating portion 12 calculates a congestion degree by date C2 (hereinafter referred to as "congestion degree by date"), which includes congestion degrees for all over the guidance route R by date. FIG. 9 shows an exemplary display screen in which the congestion degree by date C2, the route congestion degree J, the predicted required time 16, and the guidance route R searched by the guidance route search portion II are displayed.

As shown in FIG. 9, the congestion degree by time period calculating portion 12 calculates the congestion degree by date C2 of the guidance route R corresponding to a plurality of dates disposed by a predetermined rule. The congestion degree by time calculating portion 12 reads out the congestion degrees and/or the travel times for all links L composing the guidance route R at the specified time T2 within one month including the specified date T1 specified by the user (July 1 to July 31 in this case) from the traffic information database 2*b*. Based on the information, the congestion degree C2 for the entire guidance route R at the specified time T2 is calculated for each day of the month. Note that, the present embodiment is like the first embodiment, in which current date and time are used as default specified date T1 and default specified time T2 until the user specifies them.

As the method of calculating the congestion degrees by date C2 for the entire guidance route R at the specified time T2 on each date of one whole month including the specified date T1, for example, similar ways to the method of calculating congestion degrees in the first example may be used. The specified date T1 may be changed to one date within a month including the specified date T1. The specified time on the specified date T1 may be changed to the specified time T2 on the specified date. Then the congestion degree C2 for the entire guidance route R at the specified time T2 is calculated for all dates in one month including the specified date T1 (July 1 to July 31 in this case), so that the congestion degree C2 for the entire guidance route R at the specified time T2 is calculated according to each date in the month including the specified date T1. The calculated congestion degree by date C2 is displayed with various colors and/or various patterns corresponding to the congestion degrees on the display portion 4*a* of the display input unit 4 as shown in FIG. 9. The congestion degree by date C2 is displayed corresponding to each date within one month and indicated with a plurality of lateral lines. Note that the one line may indicate one week. The route congestion degree J and the predicted required time 16 are calculated in the same manner as in the first example and displayed with the guidance route R on the display portion 4*a* of the display input unit 4.

The designation of the specified date T1 by the user may be accepted by the input portion 4*b* of the display input unit 4 or the remote control input unit 5. One method of the acceptance is described in FIG. 9. The designation of a date corresponding to a position, which is specified on the display of the congestion degree by date C2 on the display portion 4*a*, is accepted by using the input portion 4*b* of the display input unit 4. More specifically, when the user touches the congestion degree by date C2 indicated by each date from July 1 to July 31 which are displayed on the display portion 4*a*, by using the input portion 4*b*, the date corresponding to the touched position is accepted as the specified date T1. The specified date T1 is highlighted with, for example, a thick border, on the congestion degree by date C2. In FIG. 9, July 20 is highlighted as the specified date T1. Note that, for example, the input of the specified date T1 may be accepted even by operation of the remote control input unit 5.

The designation of the specified time T2 may be accepted by the input portion 4*b* of the display input unit 4 or the remote control input unit 5. One method of the acceptance is described in FIG. 9. A time specification display 18 is displayed on the display portion 4*a* of the display input unit 4. A time designation may be accepted based on the specification of a point on the time specification display 18 by the input portion 4*b* of the display input unit 4. On the time specification display 18, the specified time T2 is displayed at the center of the area and triangle icons are displayed at the both sides of the specified time T2 to switch the specified time. When the user touches either of the triangle icons by the input portion 4*b* as a touch panel, the time before the current specified time T2 or the time after the current specified time T2 may be selected. Then the changed specified time T2 is displayed at the center of the display area. Note that, for example, the input of the specified time T2 may be accepted even by operation of the remote control input unit 5.

Figure 7:
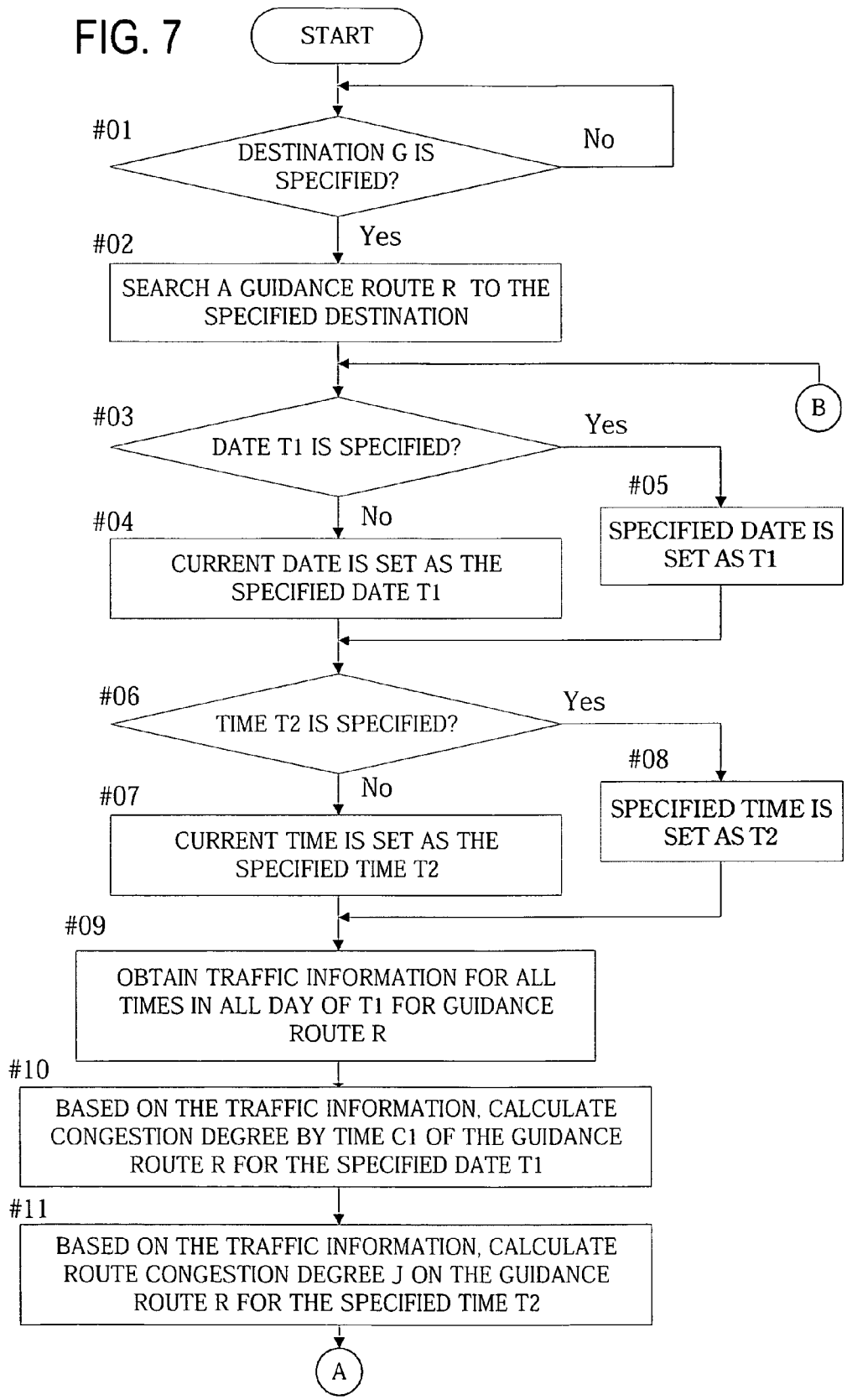
FIGS. 7 and 8 show a guidance method according to an exemplary implementation of the principles described herein.
Figure 8:
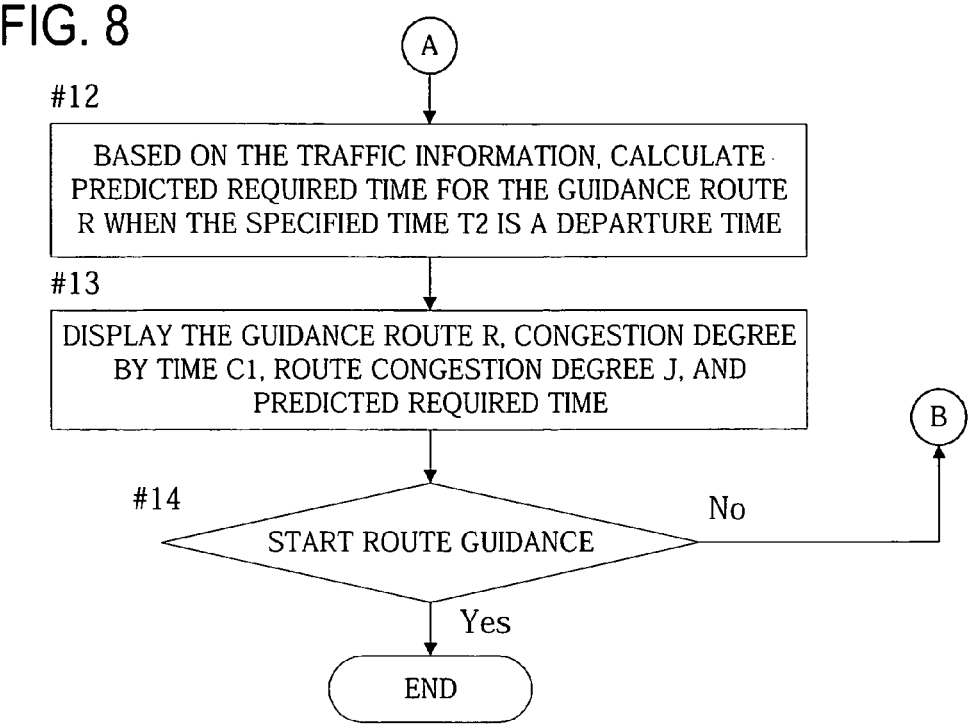

Note that, the guidance based on the congestion degrees of the guidance route R in the second example may be performed similar to the method shown in the FIG. 7 and FIG. 8. Thus, a duplicated description thereof is not given herein. The differences between the first example and the second example may include: 1) traffic information obtained from the traffic information database 2*b* in Step #09, and 2) the congestion degree by time C1 or the congestion degree by date C2 in Step #10.

Figure 10:
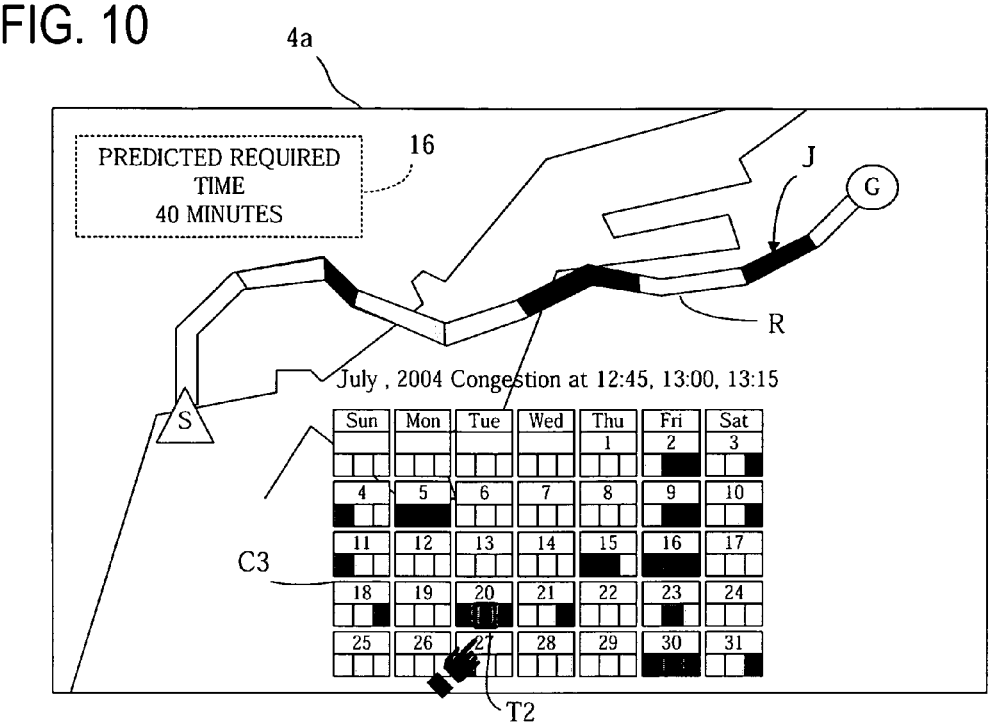
FIG. 10 shows a display screen of a navigation apparatus according to an exemplary implementation of the principles described herein.

Next, a third example will be described. In this example, "date and time" is set as a unit of time period for the time factor. The congestion degree by time period calculating portion 12 calculates the congestion degree C3 (hereinafter referred to as "congestion degree by date and time") for the guidance route R by date and time. FIG. 10 shows an example of a display screen in which the congestion degree by date and time C3, the route congestion degree J, the predicted required time 16, and the guidance route R searched by the guidance route search portion 11 are displayed.

As shown in FIG. 10, the congestion degree by time period calculating portion 12 calculates the congestion degree by date and time C3 of the guidance route R corresponding to a plurality of dates and a plurality of times disposed by a predetermined rule. Specifically, the congestion degree by time period calculating portion 12 reads out the congestion degrees and/or the travel times for all links L composing the guidance route R at the specified time T2 (13:00 in this case), at a time 15 minutes before the T2 (12:45 in this case), and at a time 15 minutes after the T2 (13:15 in this case) within one month including the specified date T1 specified by the user (July 1 to July 31 in this case) from the traffic information database 2b. Based on the information, the congestion degree C3 for the guidance route R at the specified time T2, at the time 15 minute before the T2, and at the time 15 minutes after the T2 are calculated for each day of the month. Note that, in this example, the current date and time are used as default specified date T1 and default specified time T2 until the user specifies them.

As the method of calculating the congestion degree by date and time C3 for the entire guidance route R at the specified time T2, at the time 15 minutes before the T2, and at the time 15 minutes after the T2 according to each date of one whole month including the specified date T1, for example, similar ways to the method of determining congestion degrees in the first example and/or the method of determining congestion degrees in the example may be used. The specified date T1 in the first and second examples may be changed to one date within a month including the specified date T1. The specified time on the specified date T1 in the first and second examples may be changed to one of the specified time T2, the time 15 minutes before the T2, or the time 15 minutes after the T2 on the specified date. Then congestion degrees are determined for the specified time T2, the time 15 minutes before the T2, and the time 15 minutes after the T2 on all dates in one month including the specified date T1 (July 1 to July 31 in this case), so that the congestion degree C3 for the entire guidance route R at the specified time T2, at the time 15 minutes before the T2, and at the time 15 minutes after the T2 are calculated according to each date in the month including the specified date T1.

The calculated congestion degrees by date and time C3 is displayed with various colors and/or various patterns corresponding to the congestion degrees on the display portion 4a of the display input unit 4 as shown in FIG. 10. The C3 is displayed corresponding to each date within one month and may be indicated with a plurality of lateral lines. Note that the one line indicates one week. Further, the C3 is displayed corresponding to the specified time T2, the time 15 minutes before the T2, and the time 15 minutes after the T2 disposed with each date within the display area. The route congestion degree J and the predicted required time 16 are calculated and displayed with the guidance route R on the display portion 4a of the display input unit 4 in the same manner of the first example.

The designation of the specified date T1 and the specified time T2 by the user may be accepted by the input portion 4b of the display input unit 4 or the remote control input unit 5. One method of the acceptance is described in FIG. 10. The designation of a date and a time corresponding to a position, which is specified on the display of the congestion degree by date and time C3 on the display portion 4a, is accepted by the input portion 4b of the display input unit 4. For example, when the user touches the congestion degree by date and time C3 indicated by each of time, 12:45, 13:00, and 13:15 on each date from July 1 to July 31 which are displayed on the display portion 4a, by using the input unit 4b, the date and time corresponding to the touched position are accepted as the specified date T1 and the specified time T2. For example, when 13:15 is specified as the T2, 13:15 is displayed at the center for all dates from July 1 to July 31 and 13:00 and 13:30 are displayed at both sides of 13:15. The specified time T2 on the specified date T1 is highlighted with, for example, a thick border, on the congestion degree by date and time C3. In FIG. 10, July 20 is the specified date T1 and 13:00 is the specified time T2 so that the two are highlighted. Note that, for example, the input of the specified date T1 and the specified time T2 may be accepted even by operation of the remote control input unit 5.

Guiding based on the congestion degrees of the guidance route R in the third example is similar to the method shown in the FIGS. 7 and 8. Thus, a duplicated description thereof is not given herein. The differences between the first example and the third example may include: 1) traffic information obtained from the traffic information database 2b in Step #09 and 2) the congestion degree by time C1 or the congestion degree by date and time C3 in Step #10.

Figure 15:
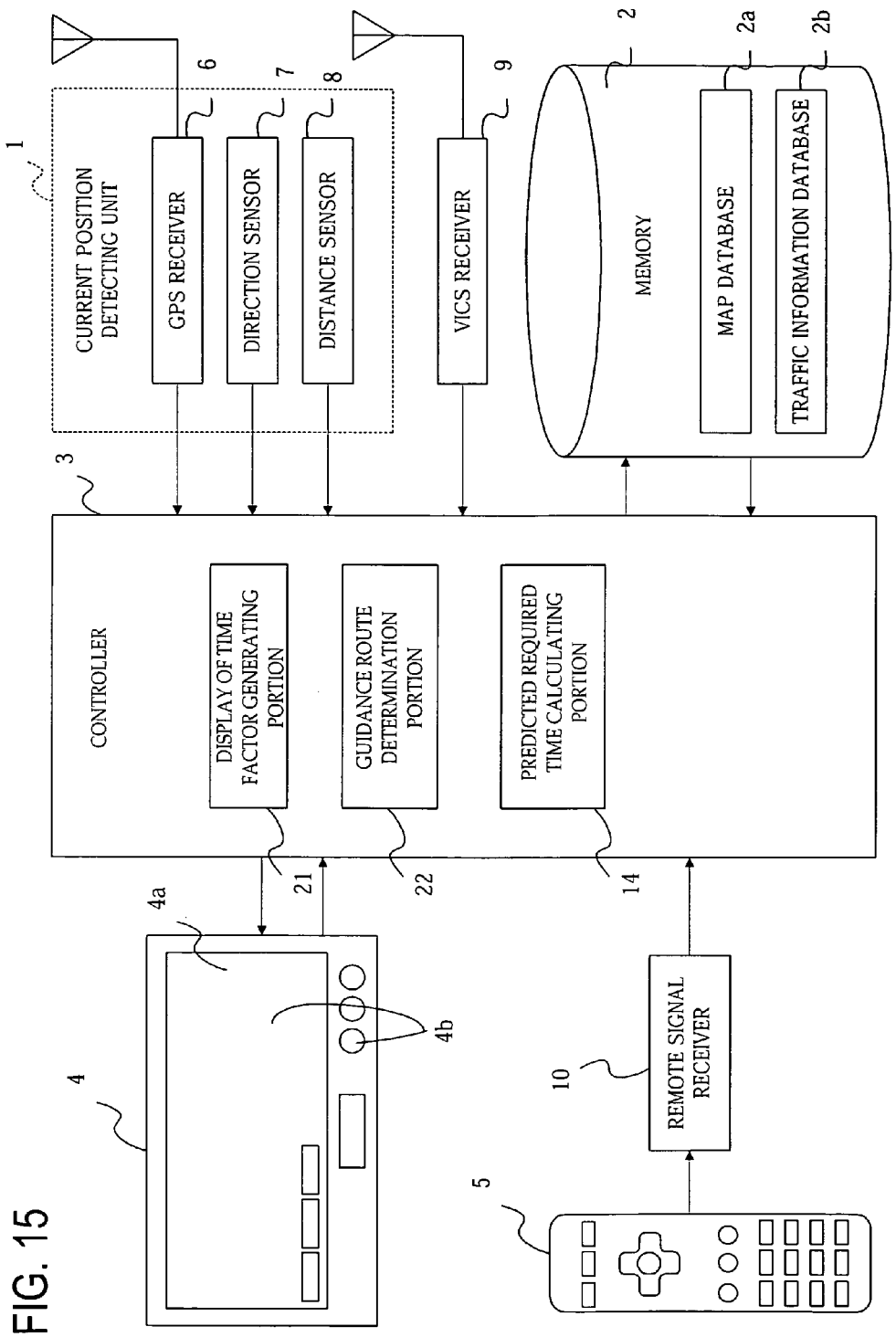
FIG. 15 shows a navigation apparatus according to an exemplary implementation of the principles described herein.

Hereinafter, a forth example will be described with reference to the drawings. FIG. 15 is a block diagram showing an outline of a hardware structure of the navigation apparatus in the present example.

As shown in FIG. 15, the navigation apparatus of the present embodiment is similar to that shown in FIG. 1. Thus, similar structures are indicated with the same reference numerals and an explanation thereof is omitted.

As shown in FIG. 15, the controller 3 of this example, may functionally, physically, and/or conceptually include, for example, a display of time factor generating portion 21, a guidance route determination portion 22, and/or a predicted required time calculating portion 14.

The display of time factor generating portion 21 generates a display of time factor, in which a specified time factor accepted by the input portion 4b of the display input unit 4 or the remote control input unit 5 as a designation accepting portion and an addressable range of time factors or a plurality of addressable times for time factors are indicated. As the unit of the time factors, for example, time, date, and/or a day of the week may be used. In the present example, the time factor is "day and time." FIG. 16 shows an exemplary display screen displayed a display of time factor Ft (hereinafter referred to as "a display of time factor") and a display of date factor Fd (hereinafter referred to as "a display of date factor") generated by the display of time factor generating portion 21 with the guidance route R determined by the guidance route determination portion 22.

Figure 16:
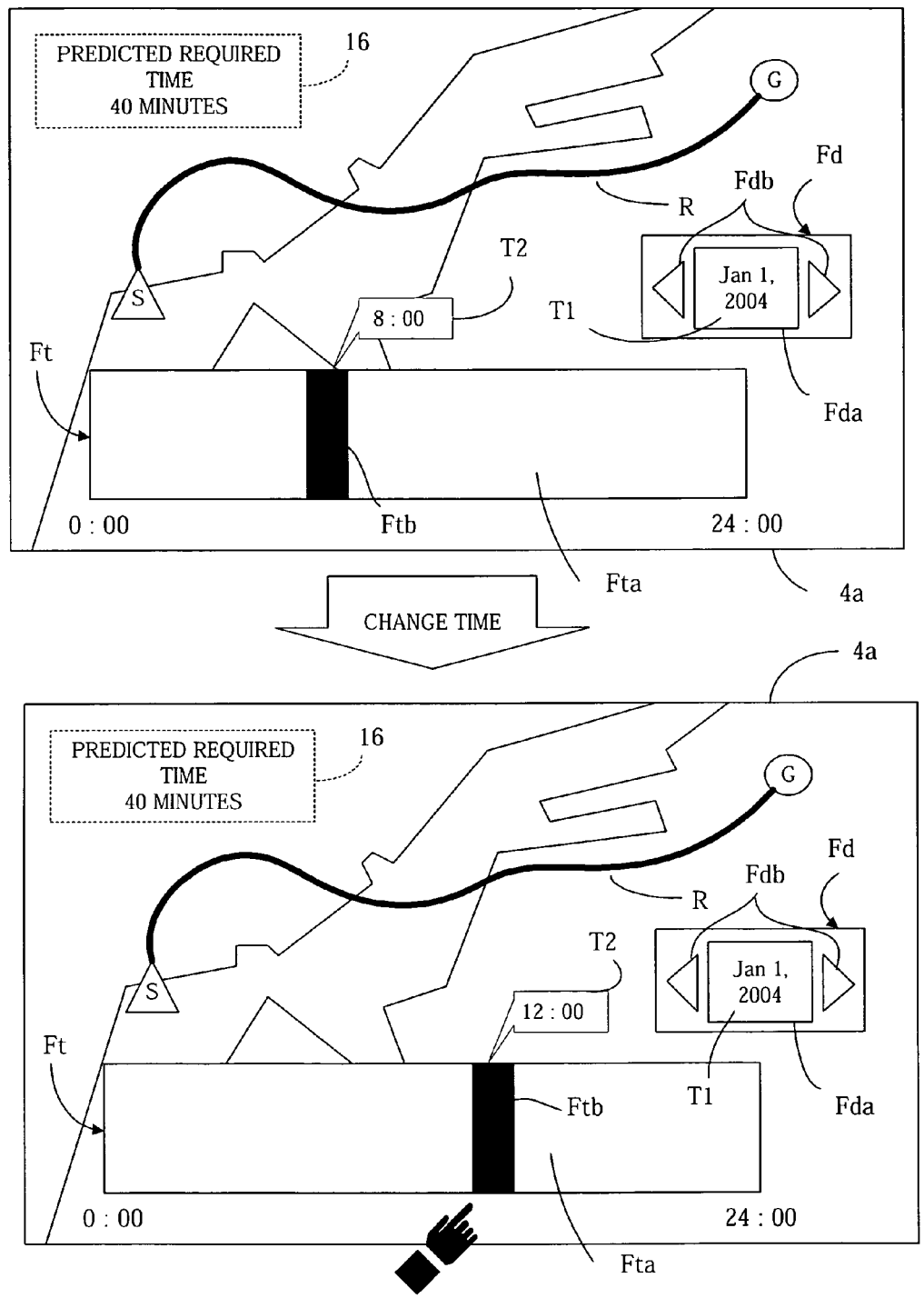
FIG. 16 shows a display screen of a navigation apparatus according to an exemplary implementation of the principles described herein.

As shown in FIG. 16, the display of time factor generating portion 21 generates the specified time T2 accepted by the input portion 4b of the display input unit 4 or the remote control input unit 5, the display of time factor Ft indicating continuous times within an addressable predetermined range along a predetermined time axis, the specified date T1 accepted by the input portion 4b of the display input unit 4 or the remote control input unit 5, and the display of date factor Fd indicating a plurality of times on an addressable date as the specified date T1 disposed based on a predetermined rule. Specifically, the display of time factor Ft includes a strip display Fta indicating times within one day from 00:00 to 24:00 along the time axis continuously. A specified time display Ftb is displayed in form of cursor on the strip display Fta and indicates the position of the specified time T2 on the time axis. Note that, in the example in FIG. 16, the specified time T2 may be displayed by characters above the specified time display Ftb as well. The specified date area Fda is in the display of date factor Fd and the specified date T1 is displayed at the center of the area Fda. In addition, the date change display elements Fdb, which are triangle icons, are displayed at both sides of the T1 in the display Fd to indicate the preceding and following dates of the specified date T1. The generated display of time factor Ft and the display of date factor Fd are displayed on the display portion 4a of the display input unit 4 as shown in FIG. 16.

When accepting the new specified time T2 by the input portion 4b of the display input unit 4 or the remote control input unit 5, the display of time factor generating portion 21 generates the new display of time factor Ft in which the specified time T2 in the specified time display Ftb is changed to the newly accepted time T2. When accepting the new specified date T1 by the input portion 4b of the display input unit 4 or the remote control input unit 5, the display of time factor generating portion 21 generates the new display of date factor Fd in which the specified date T1 the in the specified date area Fda is changed to the newly accepted date T1.

The designation of the specified time T2 may be accepted by the input portion 4b of the display input unit 4 or the remote control input unit 5. An exemplary method of the acceptance is shown in the lower screen of FIG. 16. The designation of a time corresponding to a position, which is specified on the display of time factor Ft on the display portion 4a, may be accepted by the input portion 4b of the display input unit 4. Specifically, when the user touches the display of time factor Ft along the time axis from 00:00 to 24:00 displayed on the display portion 4a by using the input portion 4b as a touch panel, the time on the time axis corresponding to the touched position is accepted as the specified time T2. The accepted specified time T2 is overlapped with the strip display Fta of the display of time factor Ft as the specified time display Ftb as described above. In the present example, a current time is set as a default specified time T2 when the user does not specify T2. Note that, for example, even if the specified time display Ftb on the strip display Fta of the display of time factor Ft is moved by operation of the remote control input unit 5, the input of the specified time T2 may be accepted.

The designation of the specified date T1 may be accepted by the input portion 4b of the display input unit 4 or the remote control input unit 5, but one method of the acceptance is described in FIG. 16. The designation of a date corresponding to a position, which is specified on the display of date factor Fd on the display portion 4a of the display input unit 4, may be accepted. Specifically, when the user touches either of the date change display elements Fdb, which are triangle icons and indicate the preceding and following dates of the specified date T1, displayed on the display unit 4a with using the input portion 4b as a touch panel, the preceding day or the following day of the specified date T1 may be accepted as the new specified date T1. The newly accepted specified date T1 is displayed at the center of the specified date area Fda. In the present example, a current date is set as a default specified date T1 when the user does not specify T1. Note that, for example, the input of the specified date T1 may be accepted even by operation of the remote control input unit 5.

The guidance route determination portion 22 searches and determines a guidance route R from a starting point S to a destination G based on the traffic information database 2b according to the specified date T1 and the specified time T2 when the user specifies the destination G and also when the specified date T1 and the specified time T2 are accepted (including when a current date and time as default values are set as the specified date T1 and the specified time T2 before the user's selection). The starting point S may depends on the current position of the vehicle detected by the current position detector 1. However, the starting point S may be specified by input of the input portion 4b of the display input unit 4 or the remote control input unit 5 by the user. According to the search and determination method of the recommended guidance route R by the guidance route determination portion 22, it is assumed that the recommended guidance route R might be changed by time factors such as date and/or time. In the present example, the following method will be described as one of the examples of the case.

This exemplary method is based on travel times of each link L composing the guidance route R. For example, as shown in FIG. 4, when the starting point S and the destination G are specified, a plurality of potential routes r1, r2, and r3 connecting the two points may be found. Each one of the potential routes r1, r2, and r3 is recognized as a series of links (L1, L2, ... Lnnn) constituting each of the potential routes. The traffic information database 2b stores the travel time information for each link L according to dates and times.

That is, according to the traffic information database 2b shown in FIG. 3, the congestion degrees (1 to 5) and the travel times (for example, 20 seconds, 135 seconds, or 42 seconds etc.) are determined for all links L1, L2, ... Lnnn identified by link numbers at a specified time (00:00 in this case) on a specified date (January 1 in this case). Thus, it is possible to calculate predicted required times for traveling each potential routes r1, r2, and r3 at the specified time T2 on the specified date T1. For example, such predicted required time may be assumed as a search cost (weighting) required for traveling the route, so that one potential route which has the lowest search cost may be determined as the recommended guidance route R.

When the new specified date T1 and/or the new specified time T2 are accepted by the input portion 4b of the display input unit 4 or the remote control input unit 5, the guidance route determination portion 22 searches and determines the recommended guidance route R at the new specified time T2 on the specified date T1 based on the traffic information database 2b.

In the description above, travel time is the only element for determining search cost for sake of simplicity. However, other well known elements in the link information La for each link L, for example, a road type (expressway, tollway, national road, prefectural road, etc.), a road width, a required time to pass through an intersection when a node N connecting links L is the intersection, a distance from the starting point to a link L or to a node N, the number of right/left turns, and the number of lanes may be used for calculating the search cost.

The predicted required time calculating portion 14 calculates the predicted required time 16 to arrive at the destination G in case that the specified time T2 on the specified date T1 is set as the starting time based on the traffic information database 2b according to the recommended guidance route R determined by the guidance route determination portion 22. More specifically, the predicted required time calculating portion 14 reads out each travel time at the specified time T2 on the specified date T1 for all links L on the recommended guidance route R from the traffic information database 2b. The total travel time for the recommended guidance route R, which is calculated by adding all the travel times is set as the predicted required time 16. The calculated predicted required time 16 is displayed on the display portion 4a of the display input unit 4 as shown in FIG. 16.

Figure 17:
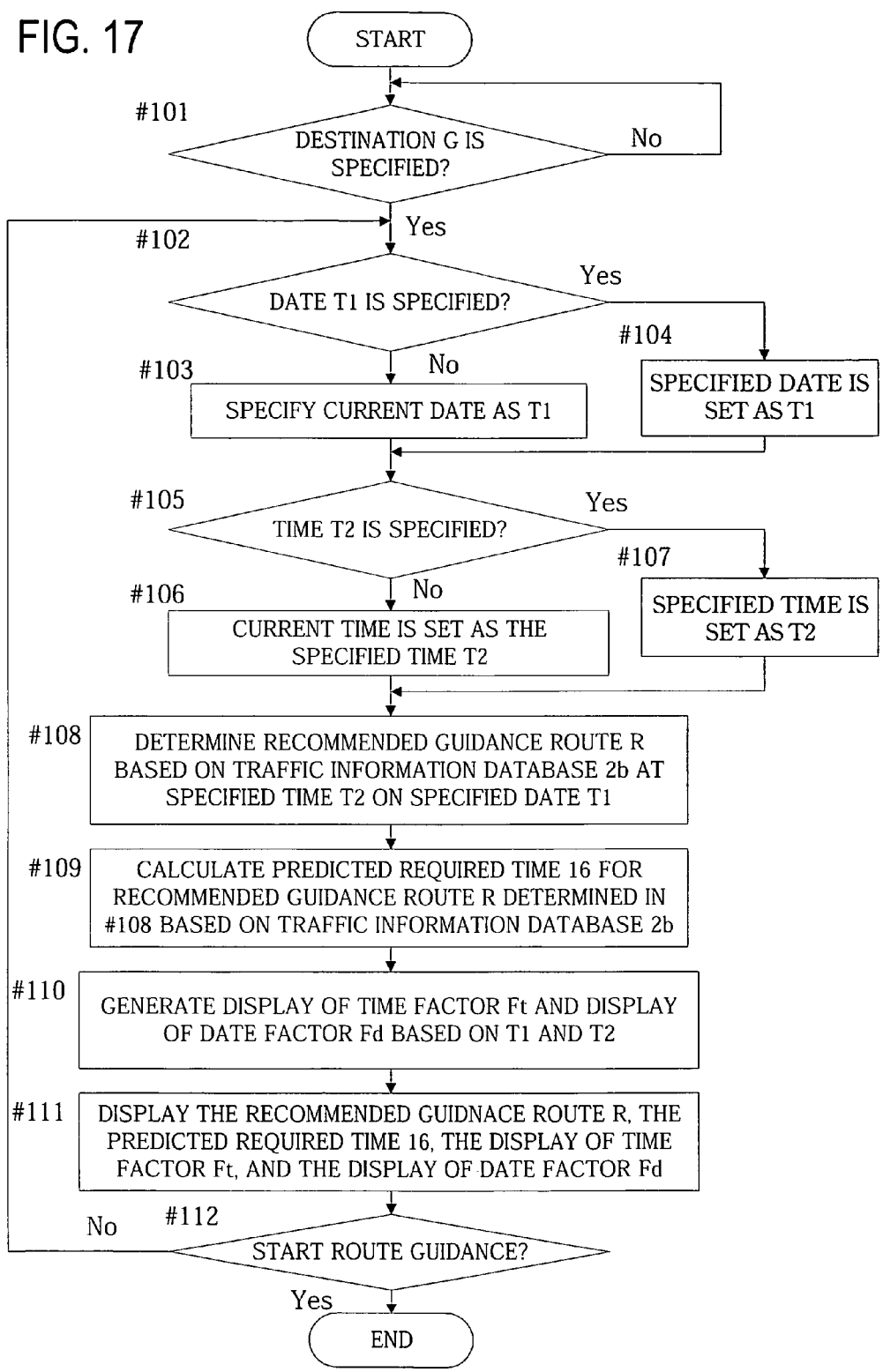
FIG. 17 shows a guidance method according to an exemplary implementation of the principles described herein.

Next, an exemplary guidance method along, for example, the recommended guidance route R at the specified time T2 on the specified date T1 by the navigation apparatus will be described with flowcharts in FIG. 17. Note that the exemplary method shown in FIG. 17 may be executed, and is described below, for example, under the control of the controller 3. However, it should be appreciated that the method need not be limited by any of the above-described structure.

As shown in the flowchart, when the user specifies the destination G (Step #101=YES), the processing proceeds to Step #102. When the date T1 has not been specified (Step #102=NO), the controller 3 sets a current date as the specified date T1 (Step #103). When the date T1 has been specified (Step #102=YES), the specified date is set as the T1 (Step #104). Generally, the user has not specified the date T1 as of specifying the destination G. Therefore, the current date is temporarily set at the T1. As with the T1, when the specified time T2 is not specified yet (Step #105=NO), the current time is set as the specified time T2 (Step #106). If the T2 has been specified (Step #105=YES), the specified time is set as the T2 (Step #107). Generally, the user has not specified the time T2 as of specifying the destination G. Therefore, the current time is temporarily set at the T2. Note that, the current date and time information may be obtained from signals received by the GPS receiver 6 or the VICS receiver 9, and/or for example, a watch with calendar function (not shown) included in the navigation apparatus.

Next, the guidance route determination portion 22 determines one recommended guidance route R, which has the shortest travel time to the specified destination G (that is, the lowest search cost) at the specified time T2 on the specified date T1, among the guidance routes R based on the traffic information database 2b (Step #108). Further, the predicted required time calculating portion 14 calculates the predicted required time 16 which is needed to travel the recommended guidance route R to the destination G in case that the specified time T2 on the specified date T1 is the starting time based on the traffic information database 2b (Step #109). The display of time factor generation portion 21 generates the display of time factor Ft based on the specified time T2 and generates the display of date factor Fd based on the specified date T1 (Step #110).

Then as shown in FIG. 16, the recommended guidance route R, the predicted required time 16, the display of time factor Ft, and the display of date factor Fd are displayed on the display portion 4a of the display input unit 4 (Step #111). Note that the top screen in FIG. 16 shows a default display screen when the user has not specified the specified date T1 and the specified time T2 yet. Therefore, the current date is set as the default date T1 (Jan. 1, 2004 in this case). The current time is set as the default time T2 (8:00 in this case).

When the actual route guidance starts (Step #112=YES), guidance of the recommended guidance route R at the specified time T2 on the specified date T1 is terminated. Meanwhile, when the actual route guidance is not started (Step #112=NO), the operation returns to Step #102. When the user specifies the specified date T1 (Step #102=YES) or when the user specifies the specified time T2 (Step #105=YES), the operation of Steps #108 through Step #111 is again executed based on the specified date T1 and the specified time T2. The recommended guidance route R calculated or generated based on the newly specified date T1 and time T2, the predicted required time 16, the display of time factor Ft, and the display of date factor Fd are displayed on the display portion 4a of the display input unit 4 (Step #111).

Figure 18:
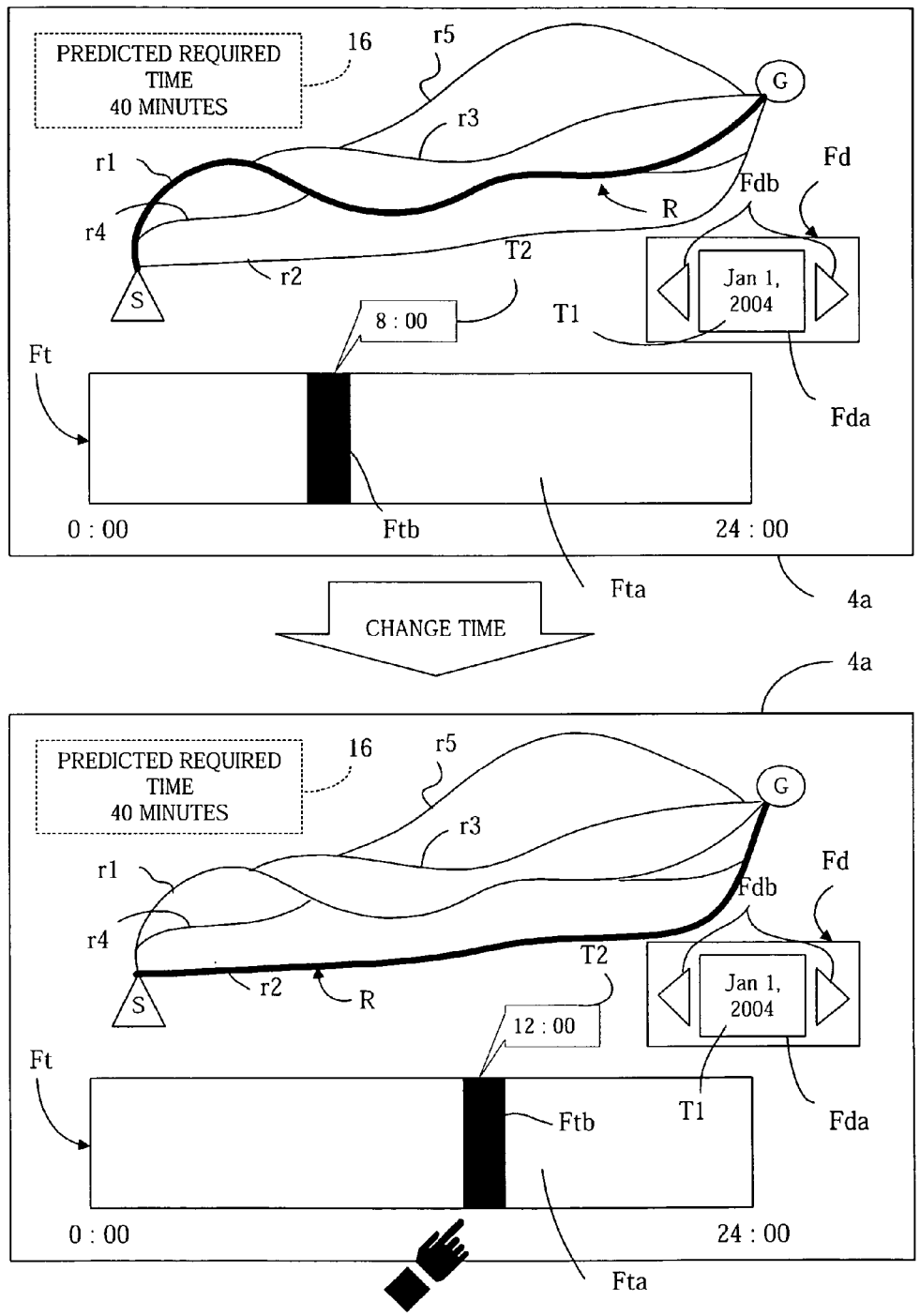
FIG. 18 shows a display screen of a navigation apparatus according to an exemplary implementation of the principles described herein.

Next, a fifth example will be described. In the forth example, the guidance route determination portion 22 determines one recommended guidance route R and displays the route R on the display portion 4a of the display input unit 4. However, according to the this fifth example, the guidance route determination portion 22 searches for a plurality of potential routes (r1 to r5 in this case) to arrive at the destination G and determines one of the potential routes as the recommended guidance route R. While the potential routes are displayed on the display portion 4a of the display input unit 4, the recommended guidance route R is highlighted among the other potential routes. FIG. 18 shows an exemplary display screen.

As shown in FIG. 18, the guidance route determination portion 22 in the searches for five potential routes r1 to r5 from the starting point S to the destination G after the user has specified the destination G. The search for the five potential routes r1 to r5 may be executed under heretofore known various conditions, which may be free from influence by time factors such as, date and time. For example, the following method may be used.

In this case, each one of the potential routes r1 to r5 is searched under different search conditions. The search conditions do not include any condition concerning time factors in this case. More specifically, for example, the guidance route determination portion 22 searches for the first potential route r1 as a standard route, the second potential route r2 as a tollway-oriented route, the third potential route r3 as a general road-oriented route, the forth potential route r4 as a short distance-oriented route, and the fifth potential route r5 as another route for different purposes and under different conditions. "Standard route" may indicate typically the most recommended route that is searched under well-balanced search conditions, for example, in terms of a road type and/or a distance. "Tollway-oriented route" may indicate a route, which preferentially includes a tollway, so that the tollway-oriented route may be searched under conditions for searching a route with as many links L on an expressway and/or tollway as possible. "General road-oriented route" may indicate a route, which preferentially includes general roads except tollways, so that the general road-oriented route may be searched under conditions for selecting as less links L on an expressway and/or tollway as possible. "Short distance-oriented route" may indicate a route with the shortest distance to the destination G, so that the route may be searched under conditions for selecting the shortest total distance of links L composing the route regardless of the road type. "Another route" may indicate a bypass not to travel on the standard route, so that the route may be searched under conditions for including as less links L on the standard route as possible.

After the five potential routes r1 to r5 are searched, the guidance route determination portion 22 selects one route among the five routes at the specified time T2 on the specified date T1 based on the traffic information database 2b. For example, the potential route that has the shortest travel time to the destination G (the lowest search cost) may be selected and determined as the recommended guidance route R. According to this example, the current date and time are set as a default T1 and T2 for determining the recommended guidance route R before the user specifies the specified date T1 and the specified time T2.

In FIG. 18, the determined recommended guidance route R, the searched five potential routes r1 to r5, the predicted required times 16, the display of time factor Ft, and the display of date factor Fd are displayed on the display portion 4a of the display input unit 4. The determined recommended guidance route R is highlighted among the other four potential routes. Specifically in the top screen shown in FIG. 18, the potential route r1 is determined as the recommended guidance route R at the specified time T2, 8:00, on the specified date T1, Jan. 1, 2004. Accordingly, the recommended guidance route R is highlighted by, for example, a thicker line than lines indicating the other potential routes r2 to r5.

In addition, in the lower screen in FIG. 18, when the change of the specified date T1 and/or the specified time T2 is accepted by the input portion 4b of the display input unit 4 or the remote control input unit 5, the guidance route determination portion 22 selects one route which has the shortest travel time to the destination G (the lowest search cost) at the new specified time T2 on the new specified date T1 among the five potential routes r1 to r5 based on the traffic information database 2b. The selected route is determined as the new recommended guidance route R and is highlighted among the other four potential routes. In the lower screen in FIG. 18, the potential route r2 is determined as the recommended guidance route R at the changed time T2, 12:00, on the same date T1, Jan. 1, 2004. Accordingly, the recommended guidance route R is highlighted by a thicker line than lines indicating the other potential routes r1 and r3 to r5. As the result, the recommended guidance route R has been changed from r1 to r2 because the potential route r1 has the shortest travel time (the lowest search cost) at the specified time T2, 8:00, but the potential route r2 has the shortest travel time at 12:00.

Note that, the method of highlighting the recommended guidance route R is not limited to the aforementioned method of displaying by thick line. For example, the recommended guidance route R may be displayed with a different color and/or a different pattern from the other potential routes.

Figure 19:
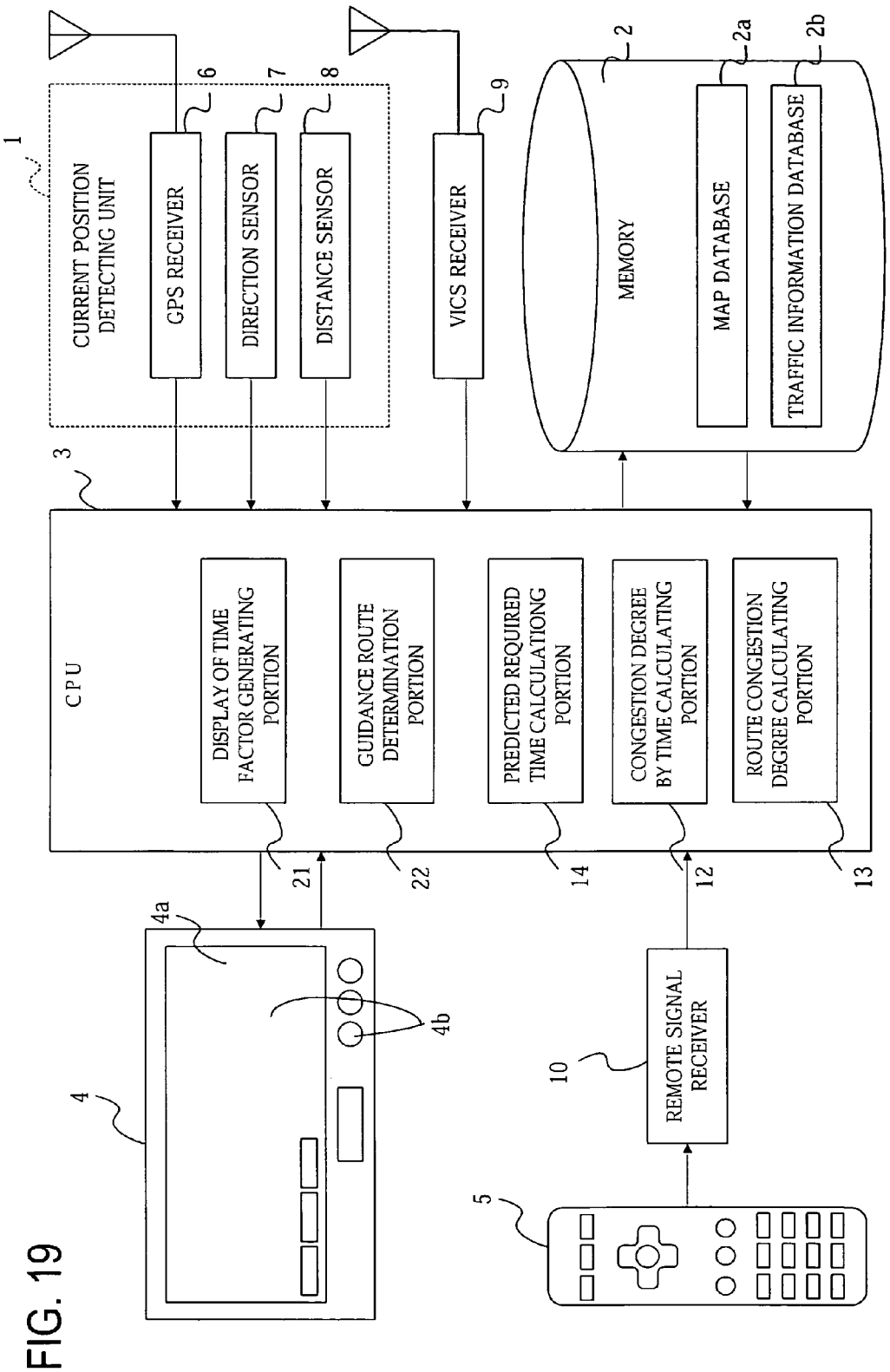
FIG. 19 shows an outline of hardware structure of a navigation apparatus according to an exemplary implementation of the principles described herein.
Figure 20:
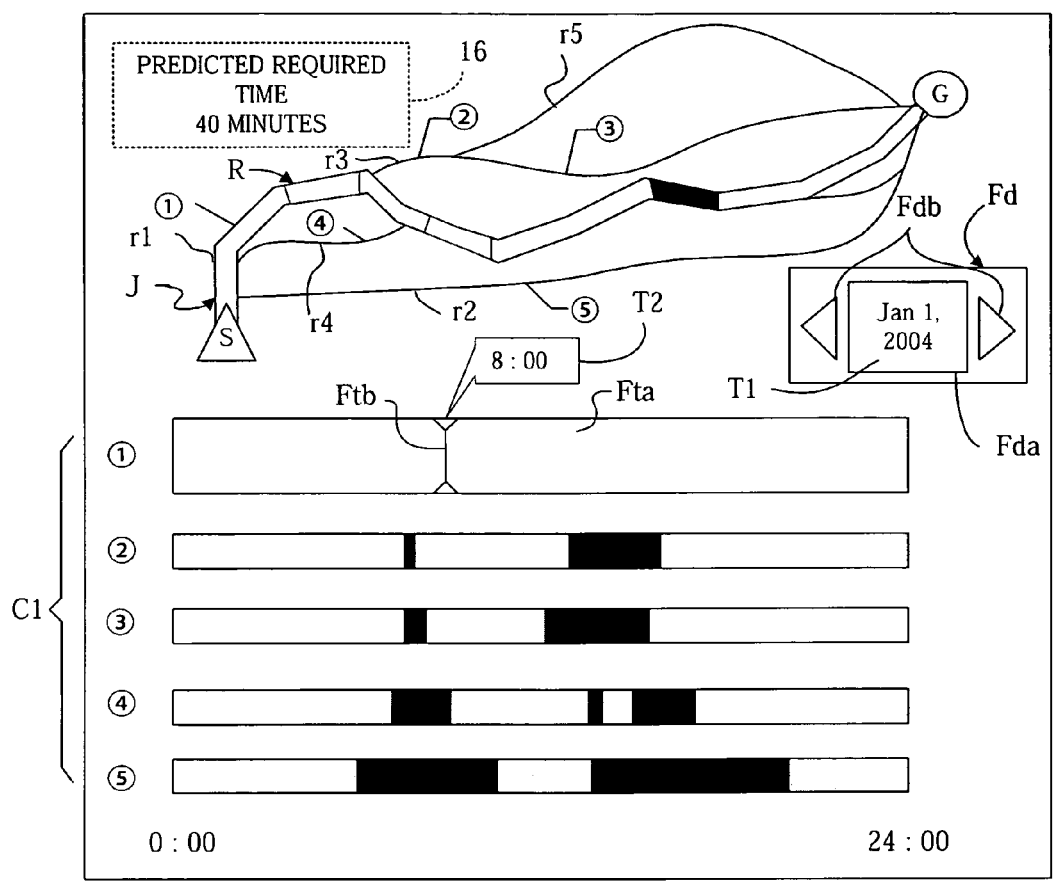
FIG. 20 shows a display screen of a navigation apparatus according to an exemplary implementation of the principles described herein.

Next, a sixth example will be described. Like the fifth example, the navigation apparatus according to the present sixth example searches for five potential routes r1 through r5 to the destination G and determines one recommended guidance route R among the routes. The navigation apparatus displays the five potential routes r1 to r5 and highlights the recommended guidance route R among the other potential routes. The navigation apparatus further displays the congestion degrees with different time factors for each one of the potential routes r1 to r5. Further, the congestion degrees at various points on the recommended route R are displayed on the display portion 4a of the display input unit 4. FIG. 19 shows an outline of a hardware structure in the navigation apparatus in the present example. FIG. 20 shows an exemplary display screen of the navigation apparatus in the present example.

As shown in FIG. 19, the controller 3 may physically, functionally, or conceptually include the congestion degree by time period calculating portion 12 and the route congestion degree calculating portion 13, (previously described with reference to FIG. 1) as well as the portions 14, 21, 22 described with reference to FIG. 15.

The congestion degree by time period calculating portion 12 calculates the congestion degrees with various time factors for the five potential routes r1 to r5 (including the recommended guidance route R) searched by the guidance route determination portion 22 based on the traffic information database 2b. In this case, the congestion degrees at different times (hereinafter referred to as "the congestion degree by time C1") are calculated. In the present example, as shown in FIG. 20, the congestion degree by time period calculating portion 12 calculates the congestion degree by time period C1 for the potential routes r1 through r5 at each time along a predetermined time axis based on the traffic information database 2b. More specifically, the congestion degree by time period calculating portion 12 reads out the congestion degrees and/or the travel times of all links L composing each one of the potential routes r1 through r5 at all times (00:00 to 23:45 in this case) on the specified date T1. Based on the information, the congestion degree by time C1 of the entire potential routes r1 to r5 is calculated according to each time along the time axis indicating one day from 00:00 to 24:00 (every 15 minutes from 00:00 to 23:45 in this case).

As the method of calculating the congestion degree by time C1, the congestion degrees of each one of the entire potential routes r1 to r5 at each time, two methods will be described below. Note that, the potential route r1 will be described as an example. However, the congestion degrees of the other routes r2 to r5 at each time may be calculated by the same method.

According to the first method of calculating congestion degree, link lengths of all links L composing the potential guidance route r1 are read out from the link information La of each link L stored in the map database 2a. The total distance of the potential guidance route r1 is calculated by adding the lengths of all links and is read out from the traffic information database 2b with the travel times of all the links L composing the potential guidance route r1 according to one time on the specified date T1. Based on the total travel time of the potential guidance route r1 calculated from the accumulated travel times, an average vehicle speed for the potential guidance route r1 is obtained, for example, according to the equation for the average speed: (Average speed)=(Total distance of potential route r1)/(Total travel time of potential route r1). The congestion degree by time period calculating portion 12 of the controller 3 sets levels (level 1 to 5) of the average speed for the potential route r1. According to this example, the level 1 is for the fastest. The congestion degree by time period calculating portion 12 includes an average speed-congestion degree table in which the average speed level is correlated to the congestion degree. In accordance with on which level of the average speed-congestion degree table the average speed of the potential guidance route r1 calculated by the equation (1) is, the congestion degree on the entire potential route r1 is determined for the time from among the five levels.

According to the second method of calculating congestion degree, only links length for links on the potential guidance route r1 whose congestion degrees are equal to or greater than a predetermined level (for example, the congestion degree is equal to or greater than 3) based on the congestion degree information for all links composing the potential guidance route r1 at one time on the specified date T1 in the traffic information database 2b are reads out from the link information La. Based on the accumulated congestion distance by adding such link lengths and the total distance of the potential route r1, the congestion distance ratio for the potential guidance route r1 is calculated, for example as: (Congestion distance ratio)=(Cumulative congestion distance)/(Total distance of potential route r1). The congestion degree by time period calculating portion 12 of the controller 3 sets the levels (level 1 to 5) of the congestion distance ratios for the potential route r1. According to this example, the level 1 is for the lowest ratio. The congestion degree by time period calculating portion 12 includes a congestion distance ratio-congestion degree table in which the congestion distance ratio is used as the congestion degree. In accordance with the level of the congestion distance ratio-congestion degree table, the congestion distance ratio of the potential route r1 calculated by the equation (2) is used to determine the congestion degree on the potential guidance route r1 for the time among the five levels.

The congestion degrees for the entire potential guidance route r1 may be calculated according to one time on the specified date T1 with the first and/or second method of calculating congestion degree. Accordingly, when the calculation processing is executed for all times on the specified date T1 (every 15 minutes from 00:00 to 23:45 in this case) based on the method(s) of calculating congestion degrees, the congestion degree by time C1 for the entire potential route r1 at each time along the time axis for the whole day of the specified date T1 may be calculated. Even in case of the other potential routes r2 to r5, the congestion degree by time C1 may be calculated for each route r2 to r5.

The calculated congestion degree by time C1 for each one of the potential routes r1 to r5 are displayed with different colors and/or different patterns corresponding to the congestion degrees on the display portion 4a of the display input unit 4 as shown in FIG. 20. The potential routes r1 to r5 are separately disposed and displayed along the horizontal time axis from 00:00 to 24:00. In this case, the potential route r1 is determined as the recommended guidance route R. Thus, the congestion degree by time C1 of the r1 is overlapped with the addressable strip display Fta continuously-indicating a predetermined time period (00:00 to 24:00 in this case) of the display of time factor Ft. Further, the specified time display Ftb indicating the specified time T2 is disposed at the position corresponding to the specified time T2 on the strip display Fta (on the congestion degree by time C1) on the time axis in the form of cursor. Accordingly, the congestion degree by time C1 is displayed as being related to the display of time factor Ft.

In addition, in FIG. 20, the potential routes r1 to r5 and the corresponding congestion degree by time C1s are displayed in understandable ways. The circled 1 to 5 are given to the potential routes r1 to r5 in the order of travel time length (in the order of search cost) to arrive at the destination G at the specified time T2 on the specified date T1 with the shortest length first. The congestion degree by time C1s of the potential routes r1 to r5 (including the recommended guidance route R) are displayed to the right of the corresponding circled numbers 1 to 5. In this manner, according to the specified time T2 on the specified date T1, the congestion degree by time period C Is of the potential routes r1 to r5 (including the recommended guidance route R) are displayed in ascending order of travel time to the destination G (in ascending order of search cost) from top down. Note that, the display colors and the display patterns for the congestion degrees of the congestion degree by time C1s are not limited. For example, higher congestion degrees may be indicated by red end colors and lower congestion degrees may be indicated by blue end colors.

The route congestion degree calculating portion 13 calculates the congestion degrees at each point (hereinafter referred to as "route congestion degree J") on the recommended guidance route R determined by the guidance route determination portion 22 at the specified time T2 on the specified date T1 based on the traffic information database 2b. In FIG. 20, the route congestion degree calculating portion 13 reads out the congestion degrees of all links L composing the recommended guidance route R at the same specified time T2 on the same specified date T1, as the time when the congestion degree by time calculating portion 12 calculated the congestion degree by time C1, from the traffic information database 2b. Then the congestion degrees of links L composing the recommended guidance route R are set as the congestion degree J which indicate the congestion degrees on various positions on the recommended guidance route R.

The calculated route congestion degree J is displayed with various colors and/or various patterns corresponding to the congestion degrees of the links L and are overlapped each position of the links L on the recommended guidance route R on the display portion 4a of the display input unit 4 as shown in FIG. 20. Note that, the display colors and the display patterns for the congestion degrees are not limited to particular ways, but it is preferable that the same display method is used as for the congestion degrees by time C1 calculated by the congestion degree by time calculating portion 12.

Both of the congestion degrees by time C1, which are calculated by the congestion degree by time period calculating portion 12, and the route congestion degree J at the specified time T2, which are calculated by the route congestion degree calculating portion 13, are estimated values because such congestion degrees are calculated based on the traffic information database 2b which stores statistically-processed past information such as, for example, past VICS information and past road traffic census information.

Figure 21:
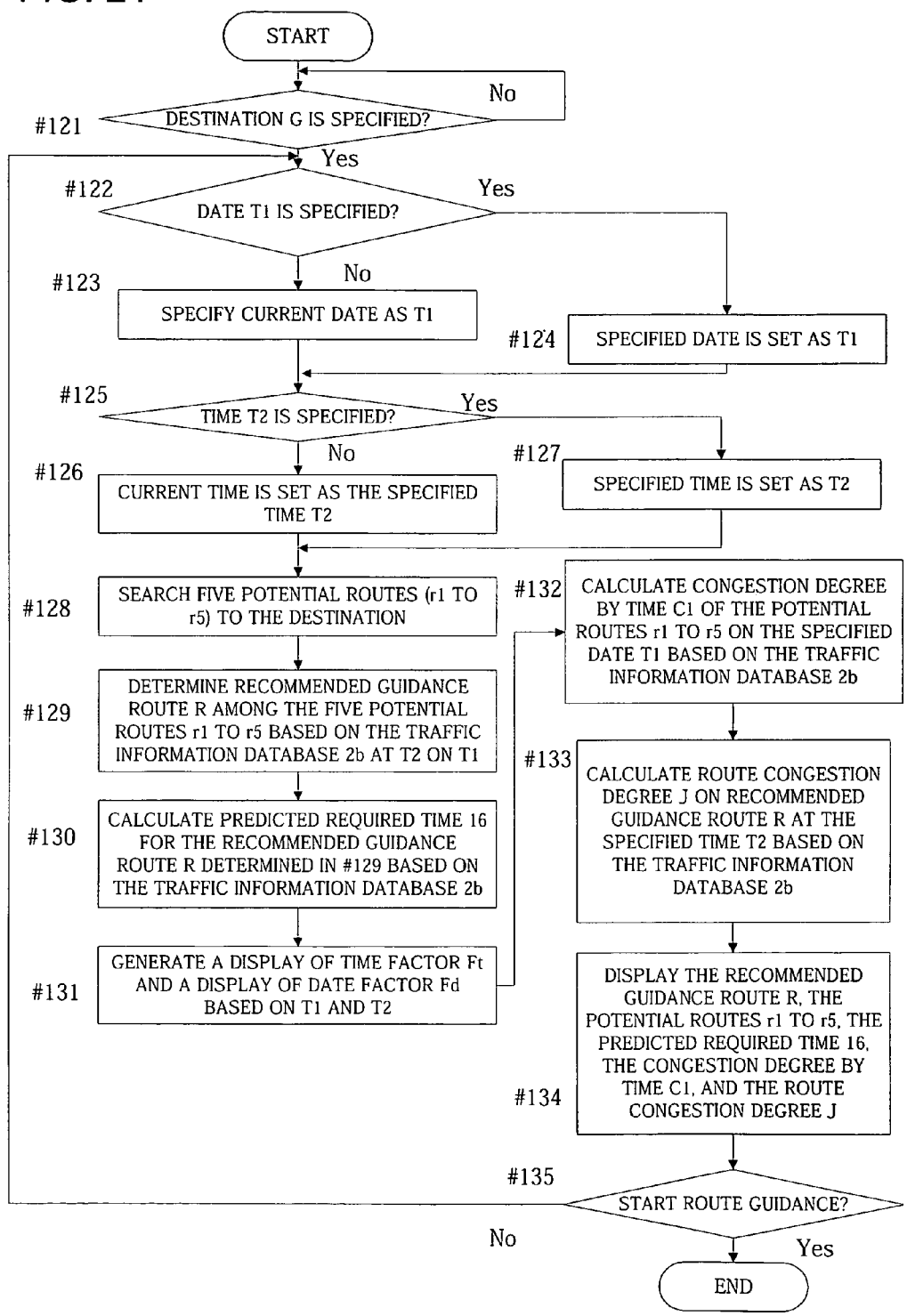
FIG. 21 shows a guidance method according to an exemplary implementation of the principles described herein.

Next, an exemplary guidance method for the five potential routes r1 to r5 including the recommended guidance route R and the congestion degree guidance for the five routes will be described with reference to FIG. 21. Note that the exemplary method shown in FIG. 21 may be executed, and is described below, for example, under the control of the controller 3. However, it should be appreciated that the method need not be limited by any of the above-described structure.

As shown in the flowchart, when the user specifies the destination G (Step #121=YES), the processing proceeds to Step #122. When the date T1 has not been specified (Step #122=NO), the controller 3 sets a current date as the specified date T1 (Step #123). When the date T1 has been specified (Step #122=YES), the specified date is set as the T1 (Step #124). Generally, the user has not specified the date T1 as of specifying the destination G. Therefore, the current date may be temporarily set at the T1. As with the T1, when the specified time T2 is not specified yet (Step #125=NO), the current time may be set as the specified time T2 (Step #126). If the T2 has been specified (Step #125=YES), the specified time is set as the T2 (Step #127). Generally, the user has not specified the time T2 as of specifying the destination G. Therefore, the current time may be temporarily set at the T2. The processing described above is similar to the flowchart (Step #101 to Step #107) in FIG. 17 according to the forth example.

Next, the guidance route determination portion 22 searches for the five potential routes r1 to r5 to arrive at the destination G (Step #128). The processing in Step #128 may not have a relationship with either of the specified date T1 or the specified time T2. Therefore, the processing may be executed before step #122. Next, the route, which has the shortest travel time to the specified destination G (that is, the lowest search cost) at the specified time T2 on the specified date T1, is determined as the recommended guidance route R among the potential guidance routes r1 to r5 based on the traffic information database 2b (Step #129). The predicted required time calculating portion 14 calculates the predicted required time 16 which is needed to travel the recommended guidance route R to the destination G in case that the specified time T2 on the specified date T1 is the starting time based on the traffic information database 2b (Step #130). The display of time factor generation portion 21 generates the display of time factor Ft based on the specified time T2 and generates the display of date factor Fd based on the specified date T1 (Step #131).

Next, the congestion degree by time period calculating portion 12 calculates the congestion degrees by time C1 for each of the five potential routes r1 to r5 including the recommended guidance route R on the specified date T1 based on the traffic information database 2b (Step #132). The route congestion degree calculating portion 13 calculates the route congestion degree J of the recommended guidance route R at the specified time T2 on the specified date T1 based on the traffic information database 2b (Step #133).

The recommended guidance route R, the five potential routes r1 to r5, the predicted required time 16, the display of time factor Ft, the display of date factor Fd, the congestion degree by time C1s for each of the five potential routes r1 to r5, and the route congestion degree J for the recommended guidance route R are displayed on the display portion 4a of the display input unit 4 (Step #134). In this case, the only congestion degree by time C1 for the recommended guidance route R is displayed in connection with the display of time factor Ft among the congestion degree by time C Is for the five potential route r1 to r5. Specifically, the congestion degree by time C1 for the recommended guidance route R is overlapped on the strip display Fta of the display of time factor Ft.

When the actual route guidance starts (Step #135=YES), the guidance of the recommended guidance route R at the specified time T2 on the specified date T1 determined among the five potential routes r1 to r5 and the guidance of the congestion degrees for the recommended guidance route R are terminated. Meanwhile, when the route guidance is not started (Step #135=NO), the operation returns to Step #22. When the user specifies the specified date T1 (Step #122=YES) or when the user specifies the specified time T2 (Step #125=YES), the operation of Steps #128 through #134 is again executed based on the specified date T1 and the specified time T2. The recommended guidance route R calculated or generated based on the newly specified date T1 and time T2, the five potential routes r1 to r5, the predicted required time 16, the display of time factor Ft, the display of date factor Fd, the congestion degree by time C Is for each of the five potential routes r1 to r5, and the route congestion degree J of the recommended guidance route R are displayed on the display portion 4a of the display input unit 4 (Step #134).

Figure 22:
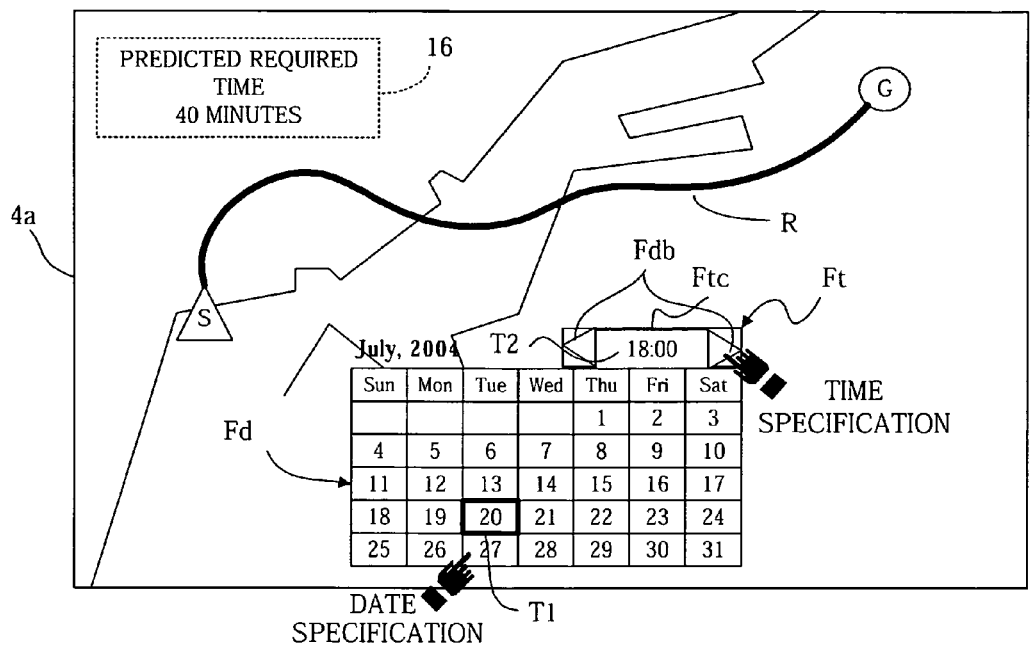
FIG. 22 shows a display screen of a navigation apparatus according to an exemplary implementation of the principles described herein.

Next, a seventh example will be described. As shown in FIG. 22, in the display of time factor Ft generated by the display of time factor generating portion 21, the specified time T2 (8:00 in this case) is displayed at the center of the specified time area Ftc and triangle icons indicating the time change elements Ftd at the both sides of the specified time T2. Any two times may be allocated as the preceding and following displays of the specified time T2 as the time change display elements Ftd. However, in this example, the time change display elements Ftd are allocated to the time 15 minutes before the specified time T2 and the time 15 minutes after the specified time T2. In the display of date factor Fd generated by the display of time factor generation portion 21, all dates within one month including the specified date T1 (July 1 to July 31 in this case) are disposed with a plurality of lateral lines. Note that the one line indicates one week. Then the generated display of time factor Ft and the display of date factor Fd are displayed on the display portion 4a of the display input unit 4 as shown in FIG. 22.

The designation of the specified time T2 may be accepted by the input portion 4b of the display input unit 4 or the remote control input unit 5. An exemplary method of the acceptance is shown in FIG. 22. The designation of a time corresponding to a position, which is specified on the display of time factor Ft on the display portion 4a of the display input unit 4, may be accepted. Specifically, when the user touches either of the time change display elements Ftd, the preceding time 15 minutes before the T2 or the following time 15 minutes after the T2 is accepted as the next specified time T2. Then the accepted specified time T2 is displayed at the center of the specified time area Ftc. Note that, for example, the input of the specified time T2 may be accepted even by operation of the remote control input unit 5.

The designation of the specified date T1 may be accepted by the input portion 4b of the display input unit 4 or the remote control input unit 5. An exemplary method of the acceptance is shown in FIG. 22. The designation of a date corresponding to a position, which is specified on the display of date factor Fd on the display portion 4a of the display input unit 4, may be accepted. More specifically, when the user touches a date among dates from, for example, July 1 to July 31, which are displayed on the display portion 4a, by using the input portion 4b, the date corresponding to the touched position is accepted as the specified date T1. The specified date T1 is highlighted with, for example, a thick border, on the display of date factor Fd. In FIG. 22, July 20 is highlighted as the specified date T1. Note that, for example, the input of the specified date T1 may be accepted even by operation of the remote control input unit 5.

Figure 23:
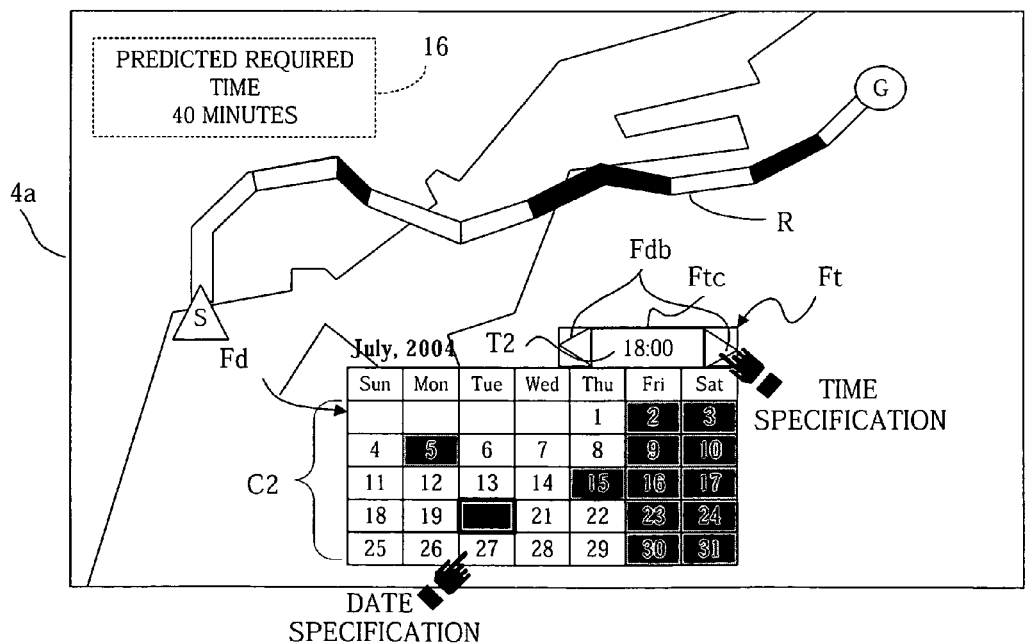
FIG. 23 shows a display screen in case of displaying congestion degrees according to an exemplary implementation of the principles described herein.

For example, as shown in FIG. 23, the congestion degrees (congestion degree by date C2) of the recommended guidance route R corresponding to each date displayed on the display of date factor Fd may be overlapped on the display of date factor Fd generated by the display of time factor generation portion 21. Specifically, the congestion degree by time period calculating portion 12 reads out the congestion degrees and/or the travel times for all links L composing the recommended guidance route R at the specified time T2 according to one month including the specified date T1 (July 1 to July 31 in this case) from the traffic information database 2b. Based on the information, the congestion degrees (the congestion degree by date C2) for the entire recommended guidance route R at the specified time T2 are calculated for each day of the month.

As the method of calculating the congestion degree by date C2 for the entire guidance route R at the specified time T2 according to each date of one whole month including the specified date T1, for example, the first method of calculating congestion degrees in the sixth example or the second method of calculating congestion degrees in the sixth example may be used. For example, a day in one month including the specified date T1 may be used instead of the specified date T1. Further, the specified time T2 time on the specified date may be used instead of one time on the specified date T1. Then the congestion degrees for all dates in one month including the specified date T1 (July 1 to July 31 in this case) are determined. Accordingly, the congestion degree by date C2 for the entire recommended guidance route R at the specified time T2 are calculated according to each date in the month including the specified date T1. The calculated congestion degrees by date C2 are displayed with various colors and/or various patterns corresponding to the congestion degrees on the display portion 4a of the display input unit 4 as shown in FIG. 23. The congestion degrees by date C2 are overlapped on each date displayed on the display of date factor Fd. Accordingly, the congestion degrees by date C2 are displayed as being related to the display of date factor Fd.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

Figure 11:
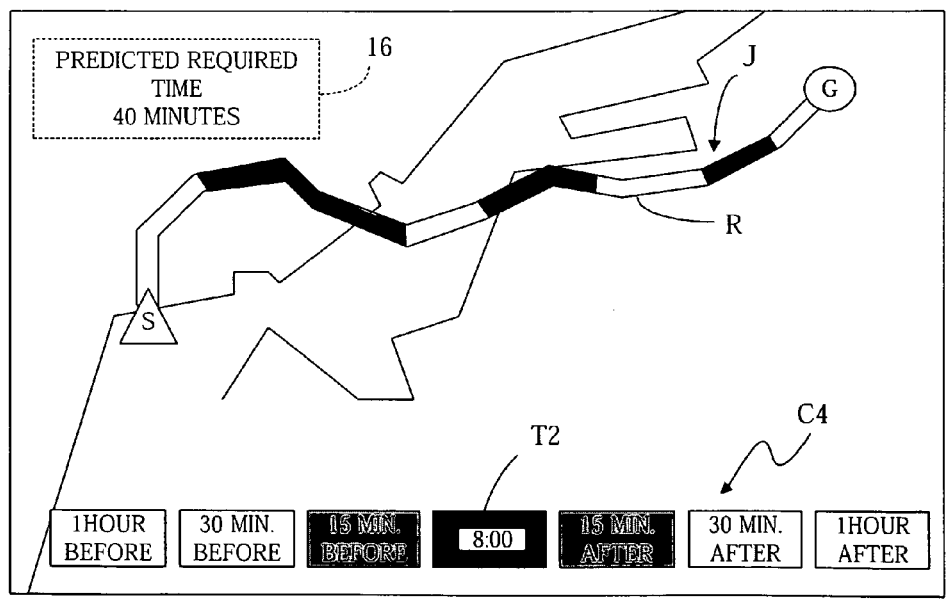
FIG. 11 shows a display screen of a navigation apparatus according to an exemplary implementation of the principles described herein.

In the first example, the case that the congestion degree C1 for the entire guidance route R is calculated for each time along the predetermined time axis, provided that the unit of the time factor is "time." However, it is possible to calculate a congestion degree C4 of the guidance route R corresponding to a plurality of times disposed along a predetermined rule. As shown in FIG. 11, the congestion degree C4 for the entire guidance route R may be calculated for the specified time T2 (8:00 in this case), the time 15 minutes before the T2, the time 30 minutes before the T2, the time 1 hour before the T2, the time 15 minutes after the T2, the time 30 minutes after the T2, and the time 1 hour after the T2 like the aforementioned embodiments. The time display sections including the specified time T2 are displayed on the display portion 4a of the display input unit 4 with various colors and/or various patterns corresponding to the congestion degrees C4s calculated for the each time. For example, when the user specifies the time 30 minutes after the current specified time T2, 8:30 is displayed at the center as the new specified time T2. In the first example, the congestion degrees by time C1 at each time along the time axis are calculated, but compared to the first example, the calculation amount in the current embodiment and a waiting time may be reduced for the user. Further, it is possible to clearly display a specifiable time as the specified time T2. Accordingly, the operability of the navigation apparatus may be improved.

Figure 12:
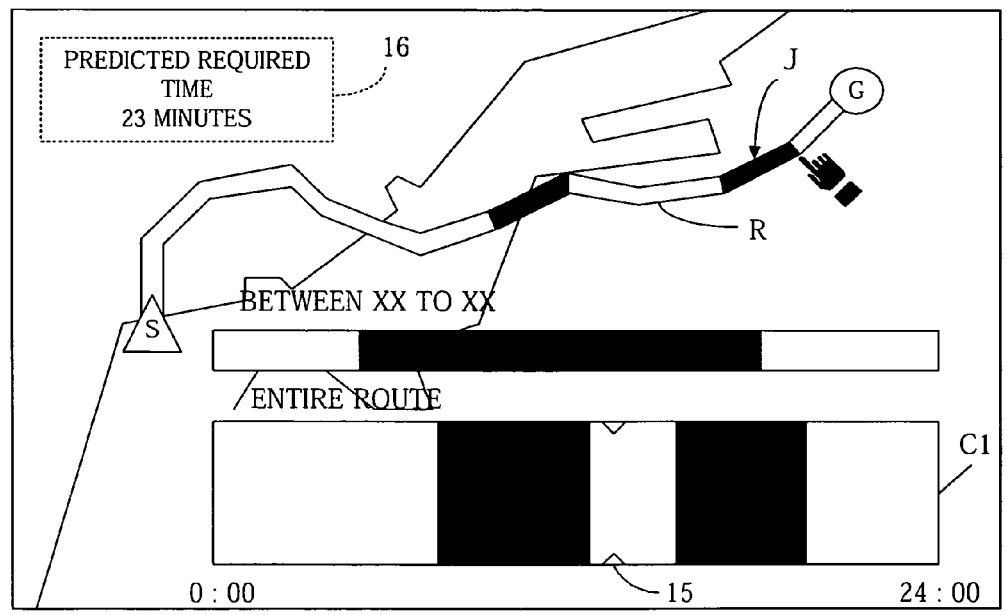
FIG. 12 shows a display screen of a navigation apparatus according to an exemplary implementation of the principles described herein.

In addition, as shown in FIG. 12, when the user specifies a point on the guidance route R displayed on the display portion 4a of the display input unit 4, it is possible to calculate and display a congestion degree C5 for the entire guidance route R at each time along the predetermined time axis (00:00 to 24:00 in this case) at the specified point (more properly, at the corresponding link L) on the guidance route R based on the traffic information database 2b. Accordingly, the user may be provided the changing congestion degree information by time at each point on the guidance route R.

Figure 13:
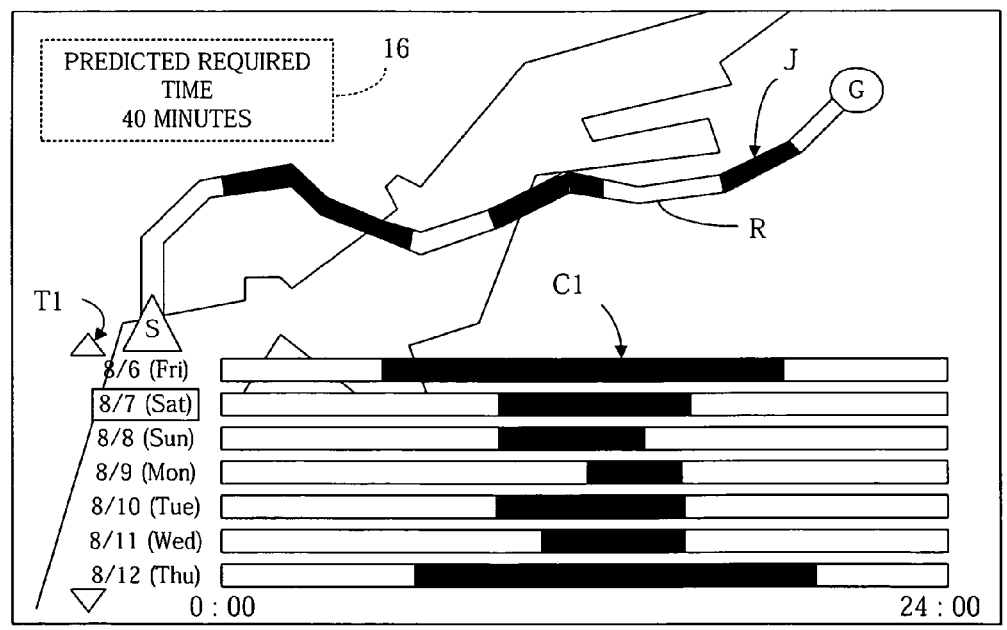
FIG. 13 shows a display screen of a navigation apparatus according to an exemplary implementation of the principles described herein.

In addition, as shown in FIG. 13, when the unit of the time factor is "day and time", it is possible to calculate the congestion degrees for the entire guidance route R at each time along the predetermined time axis (00:00 to 24:00 in this case) for a plurality of dates (for one week from August 6 to August 12 in this case) including the specified date T1 and display the congestion degrees in order by date in parallel. Accordingly, the difference of the congestion degrees among a plurality of dates and times may be understandable for the user.

In addition, in each of the second example, in the third example, and in the variation described above, as shown in FIG. 13, a day of week may be used instead of date. In this case, it is possible to calculate and display the congestion degrees by a day of week for the entire guidance route R. The traffic information database 2b may store the congestion degree information and the travel time information by a day of week and time corresponding to all links L included in the map database 2a.

Figure 14:
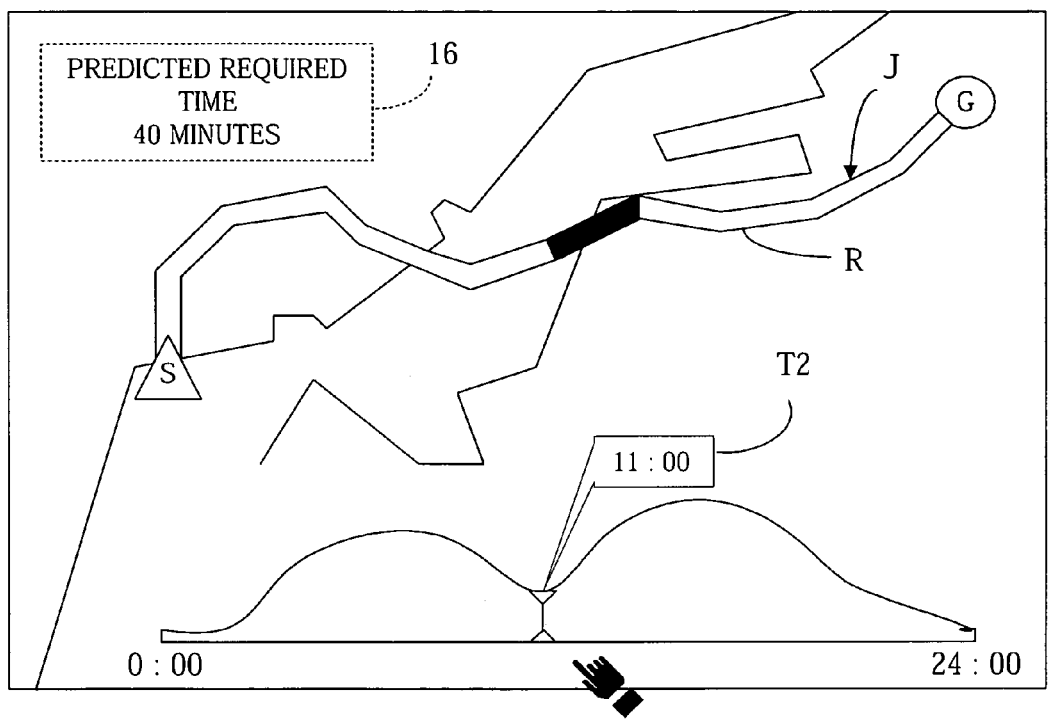
FIG. 14 shows a display screen of a navigation apparatus according to an exemplary implementation of the principles described herein.

In each of the aforementioned examples, the congestion degrees of the guidance route R are displayed with various colors and/or various patterns corresponding to the congestion degrees on the display portion 4a of the display input unit 4. However, the display method of the congestion degrees is not limited to the details of the embodiments described above. For example, as shown in FIG. 14, the congestion degrees may be displayed at right angles to the time axis or in graph form. The congestion degrees may be displayed under heretofore known various conditions.

Figure 24:
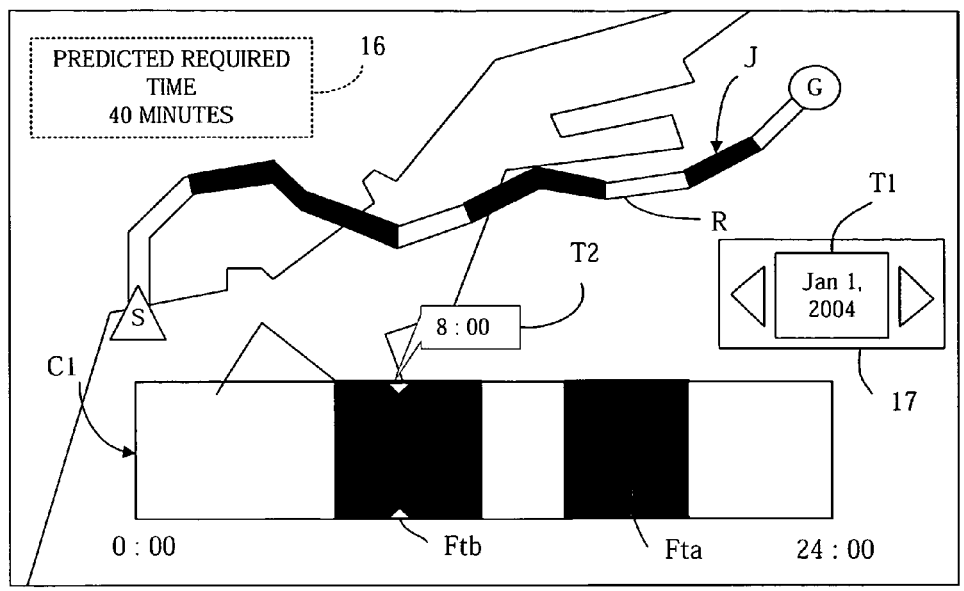
FIG. 24 shows a display screen of a navigation apparatus according to an exemplary implementation of the principles described herein.

In the forth example, one route to arrive at the destination G is determined as the recommended guidance route R and the route is displayed with the display of time factor Ft and the display of date factor Fd. As shown in FIG. 24, the congestion degree by time C Is for the recommended guidance route R at different times on the same specified date T1 and the route congestion degree J at various points on the recommended guidance route R at the specified time T2 on the specified date T1 may be calculated and displayed on the display portion 4a of the display input unit 4. The congestion degrees by time C1 are overlapped with the strip display Fta continuously-indicating a predetermined time period (00:00 to 24:00 in this case) in which the display of time factor Ft is addressable. Further, the specified time display Ftb indicating the specified time T2 is disposed at a position corresponding to the specified time T2 on the strip display Fta (on the congestion degree by time C1) on the time axis in the form of cursor. Accordingly, the congestion degree by time C1s are displayed as being related to the display of time factor Ft.

Figure 25:
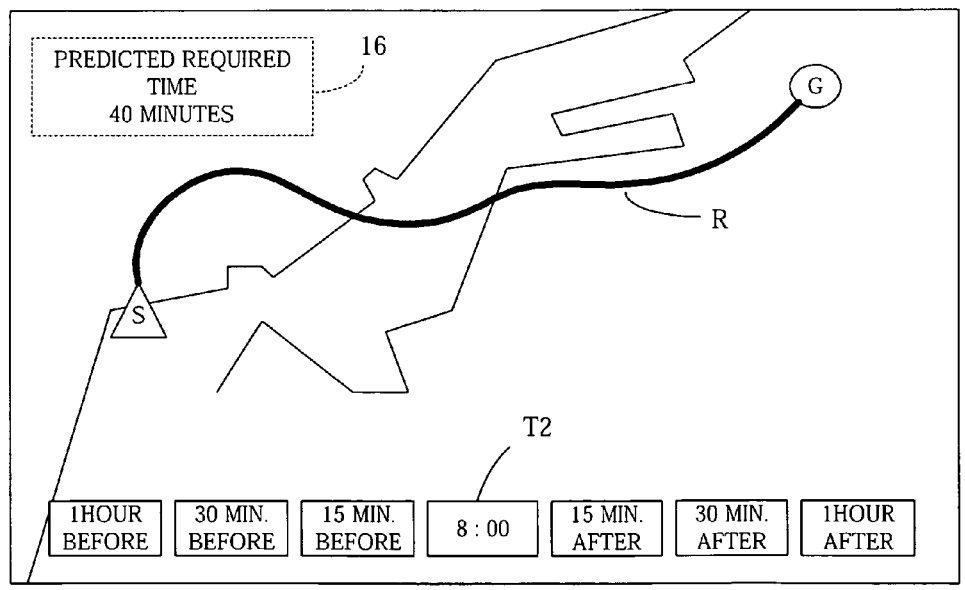
FIG. 25 shows a display screen of a navigation apparatus according to an exemplary implementation of the principles described herein.

In the forth embodiment as described above, the display of time factor generation portion 21 generates a display in a predetermined addressable time period (00:00 to 24:00 in this case) is continuously-indicated along a predetermined time axis as the display of time factor Ft. However, as shown in FIG. 25, the display of time factor generation portion 21 may generate the display of time factor Ft for disposing and displaying a plurality of specifiable points along a predetermined rule. In the example in FIG. 25, the display of time factor generation portion 21 displays times such as, for example, the specified time T2 (8:00 in this case), the time 15 minutes before the T2, the time 30 minutes before the T2, the time 1 hour before the T2, the time 15 minutes after the T2, the time 30 minutes after the T2, and the time 1 hour after the T2. In addition, the congestion degrees for the entire recommended guidance route R at each time may be displayed with the corresponding times.

In the forth to seventh embodiments as described above, the display unit for the display of date factor Fd may be changed from date to a day of the week. The recommended guidance route R at the specified time T2 on a specified day of the week may be determined based on the traffic information database 2b, so that the display of the day of the week factor and the display of time factor Ft may be displayed with the determined recommended guidance route R. The traffic information database 2b may store the congestion degree information and the travel time information by a day of week and time corresponding to all links L included in the map database 2a.

Note that, in each of the aforementioned embodiments, the case that a car navigation system installed on a vehicle is used as the navigation apparatus is described. However, the present navigation apparatus is not limited to the details of the embodiments described above, but for example, it is possible to use a navigation-equipped mobile phone or other portable navigation apparatuses.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A traffic display apparatus, comprising:
   a memory that stores traffic information for a network of roads, the network of roads composed of stored links, each stored link having corresponding stored traffic information; and
   a controller that:
      searches for a guidance route to a specified destination, the guidance route composed of a plurality of the stored links;
      based on the stored traffic information, calculates a first plurality of congestion degrees for each of the plurality of stored links constituting the guidance route, each congestion degree for each of the plurality of stored links corresponding to each of different time periods of a day;
      calculates a total distance of the guidance route;
      calculates an accumulated congestion distance by adding link lengths of the plurality of stored links constituting the guidance route that have a congestion level equal to or greater than a predetermined level based on the calculated congestion degree for each of the plurality of stored links constituting the guidance route;

calculates a congestion distance ratio by dividing the accumulated congestion distance by the total distance of the guidance route;

estimates a single congestion degree for the entire guidance route at each of the different time periods of the day based on the congestion distance ratio; and simultaneously displays the guidance route on a map and a time axis;

wherein:

the time axis depicts each of the estimated single congestion degrees for the entire guidance route at each of the different time periods of the day;

the time axis allows the selection of a particular time period of the day; and the calculated congestion degree for each of the plurality of stored links constituting the guidance route at the selected time period is depicted on the displayed guidance route.

2. The traffic display apparatus of claim 1, wherein the controller:

calculates a required time to reach the destination during the selected time period based on the traffic information; and displays the calculated required time on the display with the guidance route and the time axis.

3. The traffic display apparatus of claim 1, wherein each of the different time periods is at least one of:

a specific time of the day; or a specific time interval within the day.

4. The traffic display apparatus of claim 3, wherein:

a length of each of the different time periods is a specific time interval within the day; and the time interval is at least one of an hour, thirty minutes, and fifteen minutes.

5. The traffic display apparatus of claim 1, wherein each of the estimated congestion degrees for the entire guidance route at each of the different time periods of the day is depicted on the time axis with a corresponding color or pattern, the same color or pattern being used for a same congestion degree.

6. The traffic display apparatus of claim 1, wherein each of the estimated congestion degrees for the entire guidance route at each of the different time periods of the day is depicted on the time axis as a curve, where the height of the curve represents a magnitude of the congestion degree.

7. The traffic display apparatus of claim 1, wherein the controller:

recalculates a second plurality of congestion degrees for each of the plurality of stored links constituting the guidance route, each recalculated congestion degree for each of the plurality of stored links corresponding to a smaller time period of the day than the time period used to calculate the first plurality of congestion degrees; and updates the displayed time axis based on the recalculated congestion degrees.

8. A traffic display method, comprising:

storing traffic information for a network of roads, the network of roads composed of stored links, each stored link having corresponding stored traffic information;

searching for a guidance route to a specified destination, the guidance route composed of a plurality of the stored links;

based on the stored traffic information, calculating a plurality of congestion degrees for each of the plurality of stored links constituting the guidance route, each congestion degree for each of the plurality of links corresponding to each of different time periods of a day;

calculating a total distance of the guidance route calculating an accumulated congestion distance by adding link lengths of the plurality of stored links constituting the guidance route that have a congestion level equal to or greater than a predetermined level based on the calculated congestion degree for each of the plurality of stored links constituting the guidance route;

calculating a congestion distance ratio by dividing the accumulated congestion distance by the total distance of the guidance route;

estimating a single congestion degree for the entire guidance route at each of the different time periods of the day based on the congestion distance ratio;

simultaneously displaying the guidance route on a map and a time axis, the time axis depicts each of the estimated single congestion degrees for the entire guidance route at each of the different time periods of the day;

allowing the selection of a particular time period of the day on the time axis; and depicting the calculated congestion degree for each of the plurality of stored links constituting the guidance route at the selected time period on the displayed guidance route.

9. The traffic display method of claim 8, further comprising:

calculating a required time to reach the destination during the selected time period based on the traffic information; and displaying the calculated required time on the display with the guidance route and the time axis.

10. The traffic display method of claim 8, wherein each of the different time periods is at least one of:

a specific time of the day; or a specific time interval within the day.

11. The traffic display method of claim 10, wherein:

a length of each of the different time periods is a specific time interval within the day; and the time interval is at least one of an hour, thirty minutes, and fifteen minutes.

12. The traffic display method of claim 8, wherein each of the estimated congestion degrees for the entire guidance route at each of the different time periods of the day is depicted on the time axis with a corresponding color or pattern, the same color or pattern being used for a same congestion degree.

13. The traffic display method of claim 8, wherein each of the estimated congestion degrees for the entire guidance route at each of the different time periods of the day is depicted on the time axis as a curve, where the height of the curve represents a magnitude of the congestion degree.

14. The traffic display method of claim 8, further comprising:

recalculating a second plurality of congestion degrees for each of the plurality of stored links constituting the guidance route, each recalculated congestion degree for each of the plurality of stored links corresponding to a smaller time period of the day than the time period used to calculate the first plurality of congestion degrees; and updating the displayed time axis based on the recalculated congestion degrees.

15. A traffic display apparatus, comprising:

means for storing traffic information for a network of roads, the network of roads composed of stored links, each stored link having corresponding stored traffic information;

means for searching for a guidance route to a specified destination, the guidance route composed of a plurality of the stored links;

means for calculating, based on the stored traffic information, a plurality of congestion degrees for each of the plurality of stored links constituting the guidance route, each congestion degree for each of the plurality of links corresponding to each of different time periods of a day;

means for calculating a total distance of the guidance route;

means for calculating an accumulated congestion distance by adding link lengths of the plurality of stored links constituting the guidance route that have a congestion level equal to or greater than a predetermined level based on the calculated congestion degree for each of the plurality of stored links constituting the guidance route;

means for calculating a congestion distance ratio by dividing the accumulated congestion distance by the total distance of the guidance route;

means for estimating a single congestion degree for the entire guidance route at each of the different time periods of the day based on the congestion distance ratio;

means for simultaneously displaying the guidance route on a map and a time axis, the time axis depicts each of the estimated single congestion degrees for the entire guidance route at each of the different time periods of the day;

means for allowing the selection of a particular time period of the day on the time axis; and means for depicting the calculated congestion degree for each of the plurality of stored links constituting the guidance route at the selected time period on the displayed guidance route.

16. The traffic display apparatus of claim 1, wherein, based on a congestion distance ratio-congestion degree table, a congestion degree corresponding to the congestion distance ratio is determined as the single congestion degree for the entire guidance route.

17. The traffic display method of claim 8, wherein, based on a congestion distance ratio-congestion degree table, a congestion degree corresponding to the congestion distance ratio is determined as the single congestion degree for the entire guidance route.

* * * * *